United States Patent
Chaponniere et al.

(10) Patent No.: US 9,380,609 B2
(45) Date of Patent: Jun. 28, 2016

(54) METHOD AND APPARATUS FOR PROCESSING EMERGENCY CALLS

(71) Applicant: QUALCOMM Incorporated, San Diego, CA (US)

(72) Inventors: Lenaig Genevieve Chaponniere, San Diego, CA (US); Stephen William Edge, Escondido, CA (US); Cherng-Shung Hsu, San Diego, CA (US); Ramachandran Subramanian, San Diego, CA (US); Farrokh Khatibi, San Diego, CA (US); Arungundram Chandrasekaran Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 14/266,169

(22) Filed: Apr. 30, 2014

(65) Prior Publication Data
US 2015/0063227 A1 Mar. 5, 2015

Related U.S. Application Data

(60) Provisional application No. 61/871,299, filed on Aug. 28, 2013.

(51) Int. Cl.
*H04W 76/00* (2009.01)
*H04W 4/22* (2009.01)
(Continued)

(52) U.S. Cl.
CPC .......... *H04W 76/007* (2013.01); *H04L 65/1006* (2013.01); *H04L 65/1016* (2013.01); *H04M 7/0057* (2013.01); *H04W 4/22* (2013.01);
(Continued)

(58) Field of Classification Search
CPC H01H 33/18; H04L 65/1006; H04L 29/0619; H04M 2207/185; H04M 2242/04; H04M 7/0057; H04W 4/22; H04W 76/007
USPC .......................................................... 370/329
See application file for complete search history.

(56) References Cited

U.S. PATENT DOCUMENTS 8,315,589 B2 11/2012 Li et al.
2006/0193447 A1 8/2006 Schwartz
(Continued)

OTHER PUBLICATIONS

3GPP: "3rd Generation Partnership Project; Technical Specification Group Services and System Aspects; IP Multimedia Subsystem (IMS) emergency sessions (Release 11)," 3GPP TS 23.167, V11.8.0, (Sep. 2013), 42 Pages.

(Continued)

*Primary Examiner* — Un C Cho
*Assistant Examiner* — Shah Rahman
(74) *Attorney, Agent, or Firm* — Arent Fox LLP

(57) ABSTRACT

A method, an apparatus, and a computer program product for wireless communication are provided. The apparatus initiates a call attempt in an internet protocol multimedia subsystem (IMS) based on a dialed number, the dialed number including an emergency number. The apparatus receives a session initiation protocol (SIP) message in response to the call attempt. The apparatus determines in response to the SIP message whether to retry the call attempt as a normal call in a circuit-switched (CS) domain for an operator or as an emergency call in the CS domain for the operator. In an aspect, the determining is based at least in part on either an indication in the SIP message or on a characteristic of the operator.

28 Claims, 15 Drawing Sheets

(51) Int. Cl.
  *H04M 7/00* (2006.01)
  *H04L 29/06* (2006.01)

(52) U.S. Cl.
  CPC ...... *H04L29/0619* (2013.01); *H04M 2207/185* (2013.01); *H04M 2242/04* (2013.01)

(56) References Cited

U.S. PATENT DOCUMENTS

| | | | | |
|---|---|---|---|---|
| 2007/0060097 | A1* | 3/2007 | Edge | H04L 65/4007 455/404.1 |
| 2007/0254625 | A1* | 11/2007 | Edge | H04M 7/0078 455/404.1 |
| 2009/0047922 | A1* | 2/2009 | Buckley | H04L 63/08 455/404.1 |
| 2009/0191841 | A1* | 7/2009 | Edge | H04M 7/123 455/404.1 |
| 2010/0014508 | A1 | 1/2010 | Yang | |
| 2010/0124897 | A1* | 5/2010 | Edge | H04M 7/123 455/404.1 |
| 2010/0311386 | A1 | 12/2010 | Edge et al. | |
| 2011/0099281 | A1 | 4/2011 | Bakker et al. | |
| 2012/0015623 | A1* | 1/2012 | Bakker | H04W 4/22 455/404.2 |
| 2013/0188607 | A1* | 7/2013 | Mutikainen | H04W 4/22 370/331 |

OTHER PUBLICATIONS

International Search Report and Written Opinion—PCT/US2014/052369—ISA/EPO—Oct. 31, 2014.

* cited by examiner

1

METHOD AND APPARATUS FOR PROCESSING EMERGENCY CALLS

CROSS-REFERENCE TO RELATED APPLICATION(S)

This application claims the benefit of U.S. Provisional Application Ser. No. 61/871,299, entitled "METHOD AND APPARATUS FOR PROCESSING EMERGENCY CALLS" and filed on Aug. 28, 2013, which is expressly incorporated by reference herein in its entirety.

BACKGROUND

1. Field

The present disclosure relates generally to communication systems, and more particularly, to wireless communication using a user equipment.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., wireless spectrum, bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide common protocols that enable different wireless devices to communicate on a municipal, national, regional, and even global level. An example of a recent telecommunication standard is Long Term Evolution (LTE). LTE is an evolution of the Universal Mobile Telecommunications System (UMTS) mobile standard promulgated by the Third Generation Partnership Project (3GPP). Another approach in telecommunication is a circuit-switched (CS) network. Examples of wireless solutions supporting CS networks include Wideband CDMA (WCDMA), Global System for Mobile Communication (GSM) and CDMA2000. WCDMA and GSM are both defined by 3GPP whereas CDMA2000 is defined by the Third Generation Partnership Project 2 (3GPP2) all in publicly available documents. Various types of communications may be made using an LTE or a circuit-switched network, such as an emergency call. The emergency call notifies the network that the emergency call is a special type of call and may provide additional information (e.g. in the form of dialed digits or other call parameters) regarding special forms of call treatments such as routing to a particular Public Safety Access Point (PSAP) or providing a geographic location estimate for a calling user to a recipient PSAP. There is a need to place the emergency call in different types of networks because some networks may not support the emergency call while other networks do. Therefore, there is a demand for a convenient approach to initiate the emergency call in a network that can support the emergency call and to reinitiate an emergency call in such a network if an initially chosen network is not able to support the emergency call.

SUMMARY

In an aspect of the disclosure, a method, a computer program product, and an apparatus are provided. The apparatus initiates a call attempt in an internet protocol multimedia subsystem (IMS) based on a dialed number, the dialed number including an emergency number. The apparatus receives a session initiation protocol (SIP) message in response to the call attempt. The apparatus determines in response to the SIP message whether to retry the call attempt as a normal call in a CS domain for an operator or as an emergency call in the CS domain for the operator. In an aspect, the determining is based at least in part on either an indication in the SIP message or on a characteristic of the operator.

DETAILED DESCRIPTION

Figure 1:
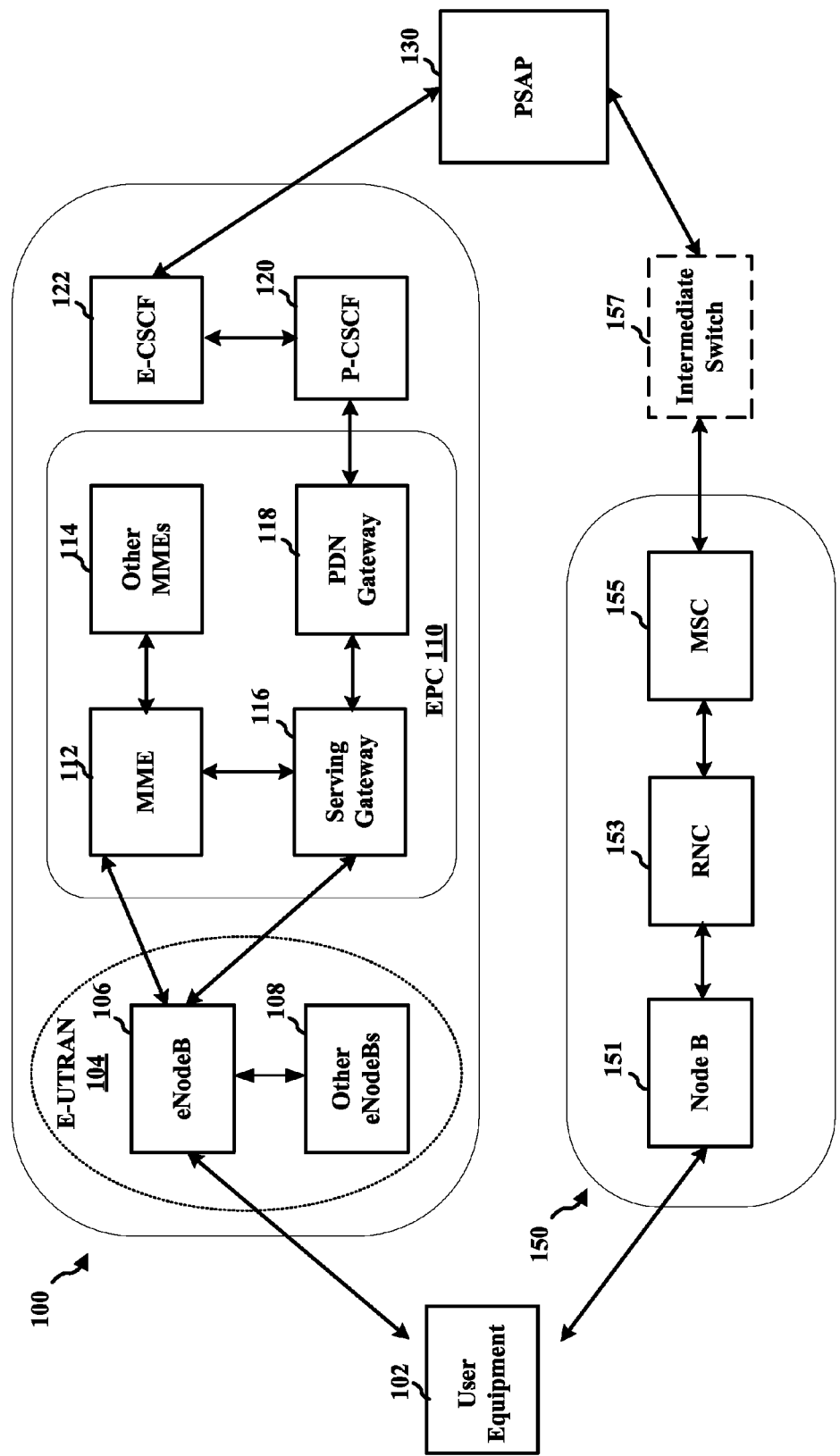
FIG. 1 is a diagram illustrating a user equipment connected to different network architectures.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware, firmware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating a user equipment connected to an LTE network architecture 100 and a circuit-switched network 150 that supports Wideband Code Division Multiple Access (WCDMA). The LTE network architecture 100 may be referred to as an Evolved Packet System (EPS) 100. The EPS 100 may include an internet protocol multimedia system (IMS). The EPS 100 may provide wireless communications services for one or more user equipments such as a user equipment (UE) 102. The EPS 100 may include an Evolved UMTS Terrestrial Radio Access Network (E-UTRAN) 104, and an Evolved Packet Core (EPC) 110. The EPS 100 can interconnect with other access networks, but for simplicity those entities/interfaces are not shown. As shown, the EPS 100 provides packet-switched services.

The E-UTRAN 104 includes the evolved Node B (eNB) 106 and other eNBs 108. The eNB 106 provides user plane and control plane protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for the UE 102. Examples of the UE 102 may include a cellular phone, a smart phone, a session initiation protocol (SIP) phone, a laptop, a personal digital assistant (PDA), a satellite radio, a global positioning system, a multimedia device, a video device, a digital audio player (e.g., an MP3 player), a camera, a game console, a tablet, or any other similar functioning device that may possess an LTE wireless interface. The UE 102 may also be referred to by those skilled in the art as a mobile station, a subscriber station, a mobile unit, a subscriber unit, a wireless unit, a remote unit, a mobile device, a wireless device, a device, a wireless communications device, a remote device, a mobile subscriber station, an access terminal, a mobile terminal, a wireless terminal, a remote terminal, a terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management and support for UE mobility. All user IP packets are transferred through the Serving Gateway 116, which itself is connected to the PDN Gateway 118. The PDN Gateway 118 provides UE IP address allocation and UE access to other entities and networks (e.g. the Internet) as well as other functions. For example, when a user initiates a call using the UE 102, the UE 102 sends the call attempt to the eNB 106, and the eNB 106 passes the call attempt to the Serving Gateway 116 and the PDN Gateway 118. The EPS 100 may further include a proxy Call Session Control Function (P-CSCF) 120 and an emergency Call Session Control Function (E-CSCF) 122. The PDN Gateway 118 is connected to the P-CSCF 120. P-CSCF 120 is an entry point to the IMS domain and serves as the proxy server for the UE 102. The UE 102 may attach to the EPC 110 prior to performing IMS registration and initiating SIP sessions via the P-CSCF 120. The P-CSCF 120 is connected to the E-CSCF 122, and the E-CSCF 122 is connected (e.g., via the Internet and/or via IP and SIP routers) to a public-safety answering point (PSAP) 130. The E-CSCF 122 may handle aspects of emergency sessions, such as routing of emergency requests to the PSAP 130.

The UE 102 may be connected to a Node B 151 of a circuit-switched (CS) network 150. The CS network 150 may include the Node B 151, a radio network controller (RNC) 153 that manages the Node B, and a mobile switching center (MSC) 155. The RNC 153 generally manages radio resources, and operates as an access point of the network, and is connected to the MSC 155. The MSC 155 generally routes voice calls and a short message service. The MSC 155 is connected to the PSAP 130. The MSC 155 is generally connected to the PSAP through an intermediate switch 157 such as a tandem switch or a selective router. In one example, the UE 102 may be attached to one of the EPS 100 and the CS network 150 at a time or to both the EPS 100 and CS network 150 at the same time. The CS network 150 shown in FIG. 1 is representative of a WCDMA CS network. However, the UE 102 may be attached to a different CS network such as a GSM or CDMA2000 CS network (not shown in FIG. 1), instead of being attached to a WCDMA CS network. Similarly, the UE 102 may be attached to a different packet switched wireless network than the LTE network shown in FIG. 1. For example the UE 102 may be attached to a CDMA2000 High Rate Packet Data (HRPD) wireless network or to a WCDMA packet network (not shown in FIG. 1) that may each provide access to an IMS including a P-CSCF 120 and an E-CSCF 122 via which an emergency call may be established with PSAP 130.

Figure 2:
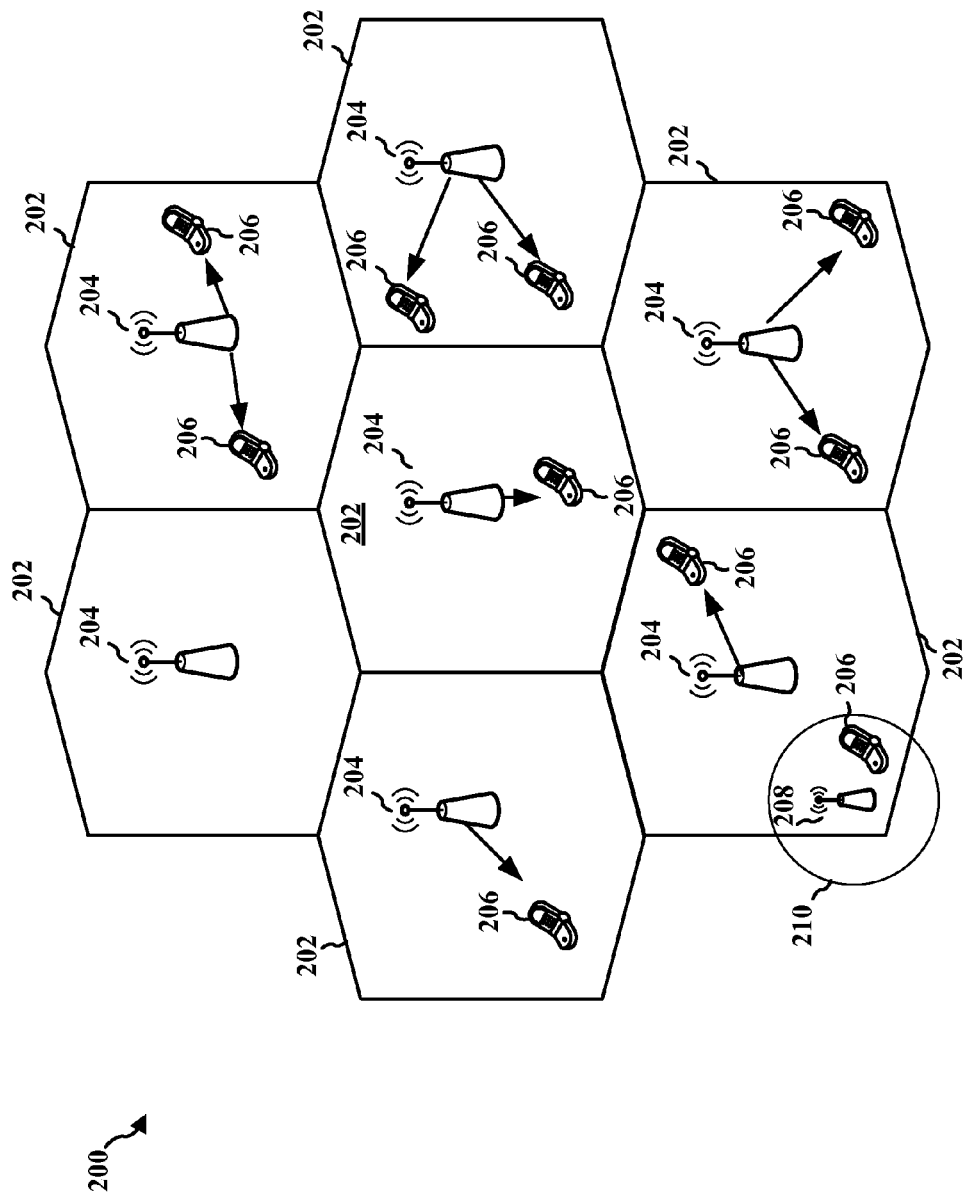
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., a home eNB (HeNB)), a small cell, a pico cell, a micro cell, or a remote radio head (RRH). The macro eNBs 204 are each assigned to one or more cells 202 and are configured to provide an access point to the EPC 110 for all the UEs 206 in the cells 202. FIG. 2 illustrates the case where each eNB 204 supports a single omnidirectional cell but other examples exist (not shown in FIG. 2) where an eNB 204 may support several sectorized cells. For example, the sectorized cells may include three cells that are each sectors of a circle with a central angle of 120°. The eNBs 204 are partly or wholly responsible for all radio related functions including support and data and control channels using available uplink and downlink spectrum, radio bearer control, admission control, mobility control, scheduling, security, and connectivity to the serving gateway 116. The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the downlink (DL) and SC-FDMA is used on the uplink (UL) to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to HRPD, Evolution-Data Optimized (EV-DO) or Ultra Mobile Broadband (UMB). HRPD, EV-DO and UMB are air interface standards promulgated by 3GPP2 as part of the CDMA2000 family of standards and employ CDMA to provide broadband Internet access to mobile stations. These concepts may also be extended to Universal Terrestrial Radio Access (UTRA) employing WCDMA and other variants of CDMA, such as TD-SCDMA; GSM employing TDMA; IEEE 802.11 (Wi-Fi); IEEE 802.16 (WiMAX); IEEE 802.20; and Flash-OFDM employing OFDMA. UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
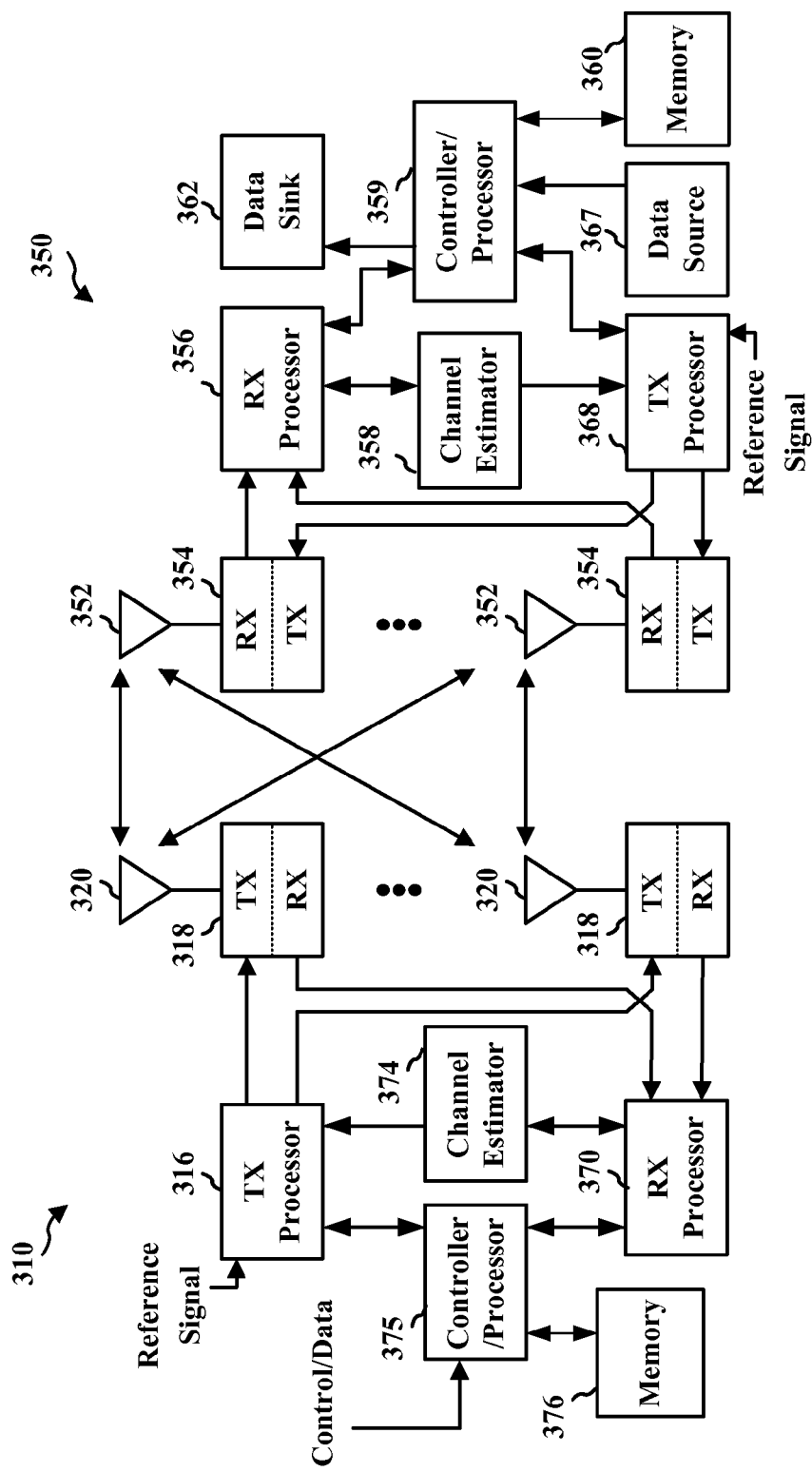
FIG. 3 is a diagram illustrating an example of an evolved Node B and user equipment in an LTE access network.

FIG. 3 is a block diagram of an eNB 310 in communication with a UE 350 in an LTE access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions include coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

A user may use a UE such as the UE 102, UE 206 or UE 350 to dial a number that will not be recognized by the UE as an emergency number. However, the dialed number may still be recognized by a serving network of the UE as an emergency number (e.g., may be recognized as an emergency number by the P-CSCF 120 or the MSC 155 in the case of UE 102 in FIG. 1). For instance, the UE may be in country A that has special local emergency numbers (e.g., 110) for country A that are not stored in the UE's Universal Subscriber Identity Module (USIM). Thus, when the user dials a number 110 on the UE in country A, the UE may not recognize the number 110 as an emergency number. It is noted that while "110" might be stored in the UE's memory as an emergency number, the rules for LTE access in 3GPP may prohibit the UE from making use of this due to the availability of the USIM of the UE. The UE may then initiate a normal call to the serving network and provide the dialed number 110. The serving network connected to the UE in country A may then recognize the number 110 as an emergency number. The network can handle the call as an emergency call if the UE is attempting the call in a circuit-switched (CS) domain (e.g., the CS network 150) or can handle the session as an emergency session if the UE is attempting the call in an internet protocol multimedia subsystem (IMS) (e.g., the LTE network 100) as an emergency session. The network can handle the call as an emergency call/session by connecting the call to the PSAP such as the PSAP 130. This type of call/session is referred to as a "non UE detectable emergency" call/session according to the terminology used in 3GPP Technical Specification (TS) 24.229 and 3GPP TS 23.167. Another example of a non UE detectable emergency call may arise when a user dials an emergency number that can be recognized by the UE 102 as an emergency number but where the user appends or prepends additional digits to the emergency number to request special services such as providing or not providing the user's telephone number and/or location to the PSAP 130. The UE 102 (or a USIM on the UE 102) may not be configured to consider these additional digits for the special services, resulting in the UE 102 treating the emergency call like a normal call. However, the serving network (e.g., the LTE network 100 or the CS network 150 in FIG. 1) may be able to parse the number into the emergency number and additional prepended or appended digits, thereby recognizing the emergency call.

If an IMS-capable UE initiates a "non UE detectable emergency" session in the IMS but the serving network does not support the IMS emergency services, the network can respond with a SIP 380 (Alternative Service) response to indicate that the UE shall use an alternative service. The SIP 380 (Alternative Service) response may contain a 3GPP IP multimedia core network (IM CN) subsystem XML body that includes an <ims-3gpp> element, including a version attribute, with an <alternative-service> child element with the <type> child element set to "emergency" (e.g. as defined in 3GPP TS 24.229). Because the <type> child element is set to "emergency," the SIP 380 (Alternative Service) response in this conventional implementation includes an indication of an emergency call. The SIP 380 (Alternative Service) response will signal to the UE that the dialed number is an emergency number even if the UE initially fails to recognize the dialed number as the emergency number. The SIP 380 (Alternative Service) response will also signal to the UE to retry the call in the CS domain because the network does not support the IMS emergency services.

The following is an example of a SIP 380 response in the conventional implementation:

```
<3gpp-ims version="1">
    <alternative-service>
        <type>
            <emergency/>
        </type>
        <reason/>
    </alternative-service>
</3gpp-ims>
```

In the above example, the UE will then retry the call in the CS domain (e.g. CS network 150) as an emergency call and may not provide the dialed digits 110 which may lead to problems as discussed further down herein.

In another exemplary mobile network, the user can make an emergency call without disclosing a caller ID to avoid disclosing the caller's identity. According to an exemplary mechanism, and as referred to above, the user may prepend an emergency number with a prefix number such as 184 or 186 to avoid disclosing the caller's identity. When a user dials the prefix number followed by the emergency number, the dialed number becomes different from the emergency number due to the prefix number preceding the emergency number. For example, if the emergency number that can be dialed is 112, the dialed number may become 184 112 with the prefix number of 184. Because the dialed number including the emergency number with the prefix number is different from the emergency number alone, the UE may not recognize the dialed number as an emergency number due to the prefix number and thus places a normal call instead of an emergency call. It is noted that if the user had dialed 112 without a prefix number, the UE could recognize the number as an emergency number since 112 is a globally known emergency number. However, the serving network may recognize the dialed number 184 112 as an emergency call even if the call is made as the normal call and may then route the normal call to the PSAP. That is, the call will be a "non UE detectable emergency" call, as discussed supra. For example, if the exemplary mechanism is used in the CS domain, the UE initiates a CS normal (i.e., non-emergency) call and the network routes the CS normal call to the PSAP.

If the exemplary mechanism is used in the IMS and the serving network does not support IMS emergency services, the network may reject the call attempt by responding with a SIP 380 (Alternative Service) response that includes an emergency indication indicating that the UE should use an alternative service. When the UE receives the SIP 380 (Alternative Service) response and the emergency indication, the UE will recognize that the dialed number is an emergency call, which subsequently causes the UE to initiate a CS emergency call. This conventional implementation may cause several issues. First, a type of call placed in the CS domain varies depending on whether the initial call attempt is made in the CS domain or whether the initial call attempt is made in the IMS and is then rejected with a SIP 380 (Alternative Service) response. In particular, if the initial call attempt is made in the IMS and is rejected with the SIP 380 (Alternative Service) response, the UE will retry the call as an emergency call in the CS domain and thus the functionality of the prefix number will be lost. For example, if the dialed number in the IMS is 184 112 where 184 is the prefix number and 112 is the emergency number, a call attempt with the dialed number 184 112 will be rejected with the SIP 380 (Alternative Service) response, and the UE will recognize the call as an emergency call and make an emergency call in the CS domain. In particular, for an emergency call in the CS domain when the CS domain supports either GSM or (as for CS domain 150 in FIG. 1) WCDMA, signaling rules in 3GPP (e.g. 3GPP TS 24.008) do not allow for inclusion of a prefix number. In contrast to this, if 184 112 is dialed when the UE is initially accessing the CS domain and not the LTE domain, the UE will consider this call attempt as a normal call, and will make a call for 184 112 as the normal call (since the number 184 112 will not be recognized by the UE as an emergency number). The CS domain (e.g. the MSC 155) can then recognize the call as an emergency call and recognize the 184 prefix, leading to an emergency call (e.g., to PSAP 130) and withholding of the user's caller ID. In contrast, when the call is first attempted in the IMS (LTE) domain and then retried in the CS domain after the UE receives a SIP 380 response as described above, the UE retries the call as a CS emergency call and not as a CS normal call in the CS domain, resulting in the user's caller ID not being withheld, and thus the functionality to be provided by the prefix number is lost.

In another exemplary mechanism, the UE may treat the number 112 as an emergency number because 112 is a universally recognized emergency number in this example whereas the UE may treat the number 110 as a normal number because in this example 110 is not stored on the USIM as described earlier herein. Thus, if the UE initiates a CS emergency call due to dialing of 112, the network routes the call to the 112 PSAP destination. If the UE initiates a CS normal call to number 110 (due to the UE not recognizing 110 as an emergency number), the network may still recognize the number 110 as an emergency number and may thus route the call to a different 110 PSAP destination ("non UE detectable emergency" call) than a destination used for a call to the 112 emergency number. A CS network may thereby support two different PSAP destinations—a first destination for the 112 emergency number and a second destination for the 110 emergency number. If the UE is attached to an LTE network and initiates a normal IMS session for the number 110 (due to the UE not recognizing 110 as an emergency number) and the network does not support IMS emergency services, the network will respond with a SIP 380 (Alternative Service) response with an emergency indication. The SIP 380 (Alternative Service) response will then cause the UE to make a CS emergency call that will then be routed to the 112 PSAP destination, instead of the desired 110 PSAP destination. These examples show problems with handling of an unrecognized emergency call when the unrecognized emergency call is first tried in an LTE and IMS network (or in another packet switched wireless network such as a packet switched WCDMA network that contains an IMS) and is then retried in a CS network as a CS emergency call as a result of the LTE/IMS network returning a SIP 380 response to the calling UE.

Figure 4:
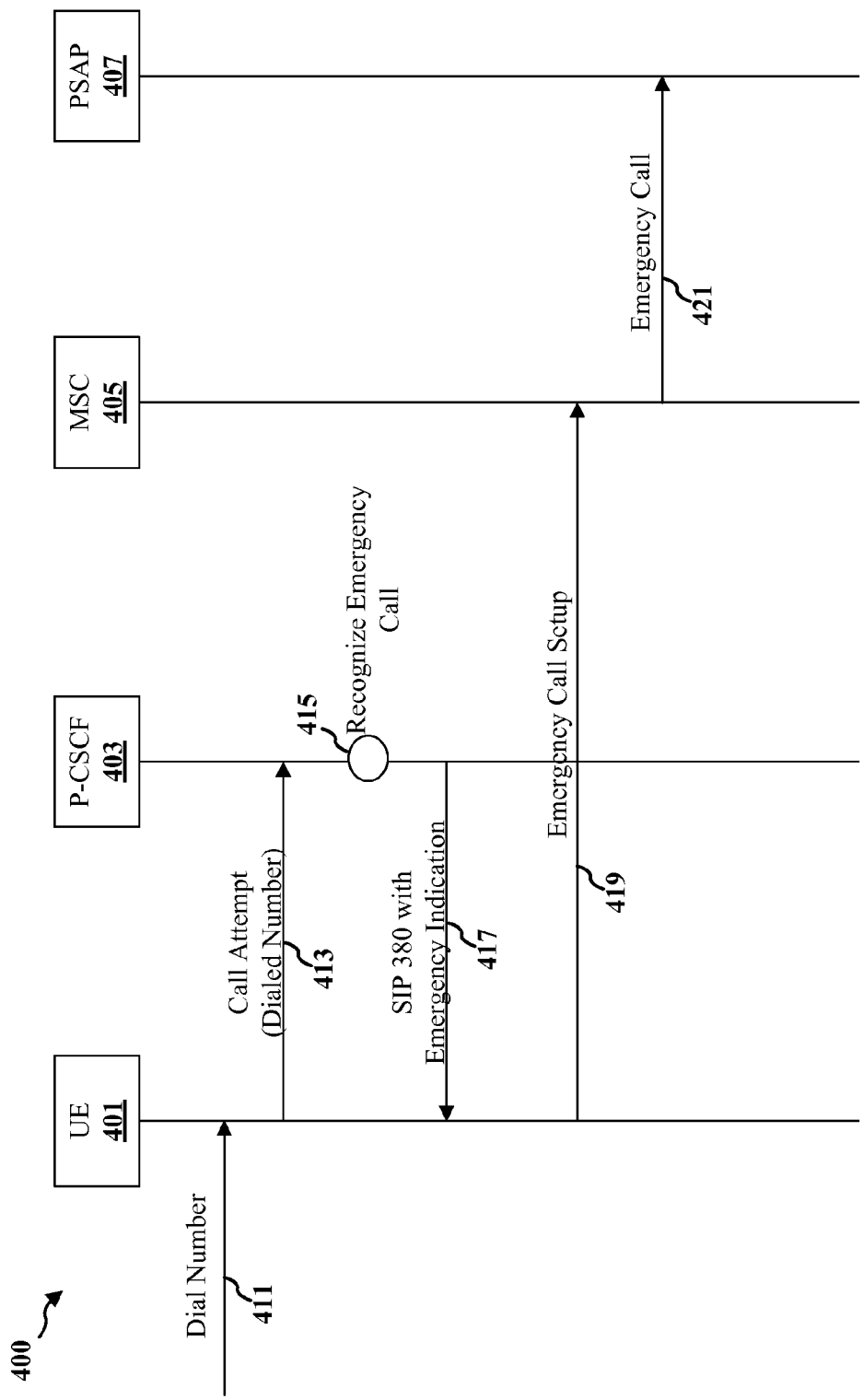
FIG. 4 is an exemplary flow diagram illustrating a call implementation.

FIG. 4 is an exemplary flow diagram 400 illustrating a call implementation embodying the various problems described above. The flow diagram 400 includes a UE 401, a P-CSCF 403, an MSC 405, and a PSAP 407. The UE 401, the P-CSCF 403, the MSC 405, and the PSAP 407 may respectively correspond with the UE 102, the P-CSCF 120 of the IMS network in EPS 100, the MSC 155 of the CS network 150, and the PSAP 130 of FIG. 1. The UE 401 initially attaches to an LTE network that includes an IMS network. At step 411, the user dials a number using the UE 401. At step 413, the UE 401 does not recognize the dialed number as an emergency number and consequently initiates a call attempt as a normal call with the dialed number (e.g., by sending a SIP INVITE containing the dialed number) to the P-CSCF 403 of the IMS network. At step 415, the P-CSCF 403 recognizes the emergency call by recognizing the dialed number received in step 413 as an emergency number. At step 417, P-CSCF 403 sends a SIP 380 with an emergency indication to the UE 401. At this point, the UE may attach to the CS network (e.g., if the UE is not already attached to the CS network). At step 419, the UE 401 sends an emergency call setup (e.g., by sending an EMERGENCY SETUP message) to the MSC 405 of the CS network. At step 421, the MSC 405 sends an emergency call to the PSAP 407 based on the emergency call setup.

Several approaches may be utilized to address the issues discussed above. The first approach is to remove an emergency indication from the SIP 380 (Alternative Service) response. In the first approach, when the UE initiates a non UE detectable emergency session in the IMS with a dialed number including an emergency number and possibly a prefix number and the network does not support the IMS emergency services, the network responds by sending the UE a SIP 380 (Alternative Service) message without an indication that the dialed number is an emergency number. For instance, the network can respond with a SIP 380 (Alternative Service) message that contains a 3GPP IM CN subsystem XML body that includes an <ims-3gpp> element, including a version attribute, with an <alternative-service> child element, but the <type> child element set to "emergency" is excluded from the SIP 380 (Alternative Service) response. The SIP 380 (Alternative Service) response without the emergency indication can cause the UE to retry the call attempt in the CS domain as a normal call rather than as an emergency call, since the SIP 380 response does not indicate to the UE that the dialed number is an emergency number.

Figure 5:
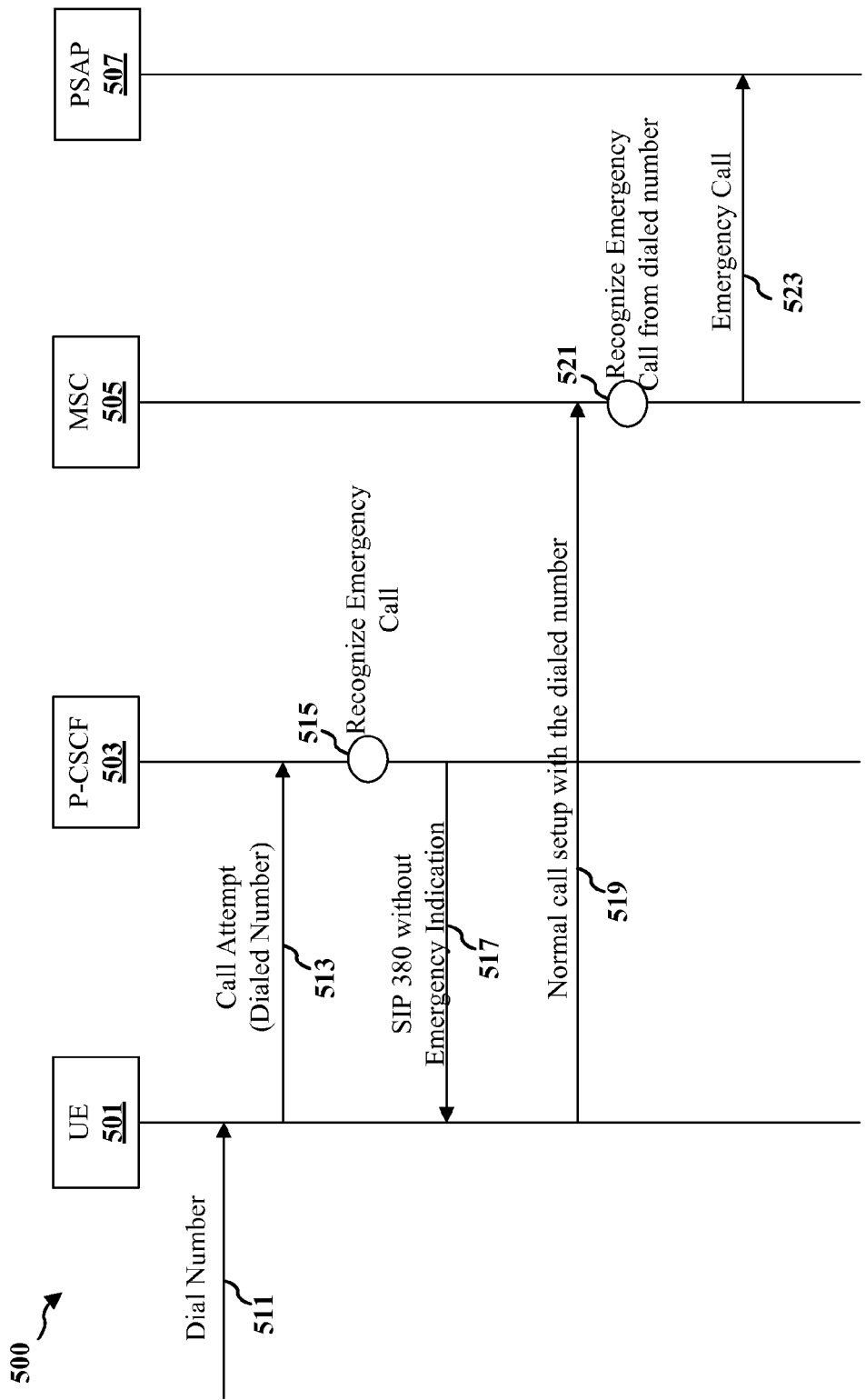
FIG. 5 is a flow diagram illustrating an implementation according to one embodiment of the disclosure.

FIG. 5 is a flow diagram 500 illustrating an implementation according to the first approach of the disclosure. The flow diagram 500 includes a UE 501, a P-CSCF 503, an MSC 505, and a PSAP 507. The UE 501, the P-CSCF 503, the MSC 505, and the PSAP 507 may respectively correspond with the UE 102, the P-CSCF 120 of the IMS network in the EPS 100, the MSC 155 of the CS network 150, and the PSAP 130 of FIG. 1. The UE 501 initially attaches to an LTE network that contains an IMS network. At step 511, the user dials a number using the UE 501, where the dialed number includes an emergency number and possibly a prefix number. At step 513, as a result of not recognizing the dialed digits as an emergency number, the UE 501 initiates a call attempt as a normal call with the dialed number via the P-CSCF 503 of the IMS network. At step 515, the P-CSCF 503 recognizes the emergency call by recognizing the dialed emergency number received in step 513. At step 517, P-CSCF 503 sends a SIP 380 without an emergency indication to the UE 501. At this point, the UE 501 may attach to the CS network. At step 519, in response to the SIP 380 message without the emergency indication, the UE 501 sends a normal call setup with the dialed number to the MSC 505, in order to retry the call attempt as a normal call with the dialed number. At step 521, the MSC 505 recognizes the emergency call from the dialed number. At step 523, the MSC 505 selects a PSAP 507 based on the dialed emergency number and sends an emergency call to the PSAP 507. It is noted that the MSC 505 may apply a special treatment indicated by the dialed number, such as privacy and/or routing to different PSAPs.

The second approach is to use the SIP 380 (Alternative Service) response including an additional new element. In the second approach, when the UE initiates a non UE detectable emergency session in the IMS with a dialed number including an emergency number and possibly a prefix and/or postfix number and the network does not support IMS emergency services, the network sends the UE a SIP 380 (Alternative Service) response including the same conventional contents (e.g., including an emergency indication) and an additional new element. In a first example, the new element in the SIP 380 (Alternative Service) response indicates to the UE that the call in the CS domain will be a normal call. Thus, the SIP 380 (Alternative Service) response includes both the emergency indication and the additional new element indicating the call in the CS domain is to be made as a normal call. For instance, the network can respond with a SIP 380 (Alternative Service) response that contains a 3GPP IM CN subsystem XML body that includes an <ims-3gpp> element, including a version attribute, with an <alternative-service> child element with the <type> child element set to "emergency" and with a new child element set to "normal" or "normal CS call". This signals to the UE that the dialed number is in fact an emergency number, the UE shall retry the call in the CS domain since the network does not support IMS emergency services, and the call in the CS domain shall be initiated as a normal (non-emergency) call. In a second example, the additional new element may indicate to the UE that the call in the CS domain will be a normal call using digits provided in the SIP 380 (Alternative Service) response. Thus, in the second example, the UE may retry the call attempt as the normal call in the CS domain using the digits provided in the SIP 380 (Alternative Service) response. It is noted that the network may choose to include or not to include the additional new element in the SIP 380 response based on whether or not the dialed digits contain information of significance to the call which is more than just indicating an emergency call. For example, if the dialed digits include a prefix associated with special call treatment (e.g., withholding of the user caller ID) or include a special emergency number associated with a different PSAP destination than used for another emergency number, the network may include the additional new element. Conversely, if none of these conditions apply (e.g., if the dialed number contains just a normal emergency number for the network and no prefix), the network may omit the additional new element since it may be acceptable to retry the call as an emergency call in the CS domain without providing the dialed number.

Figure 6:
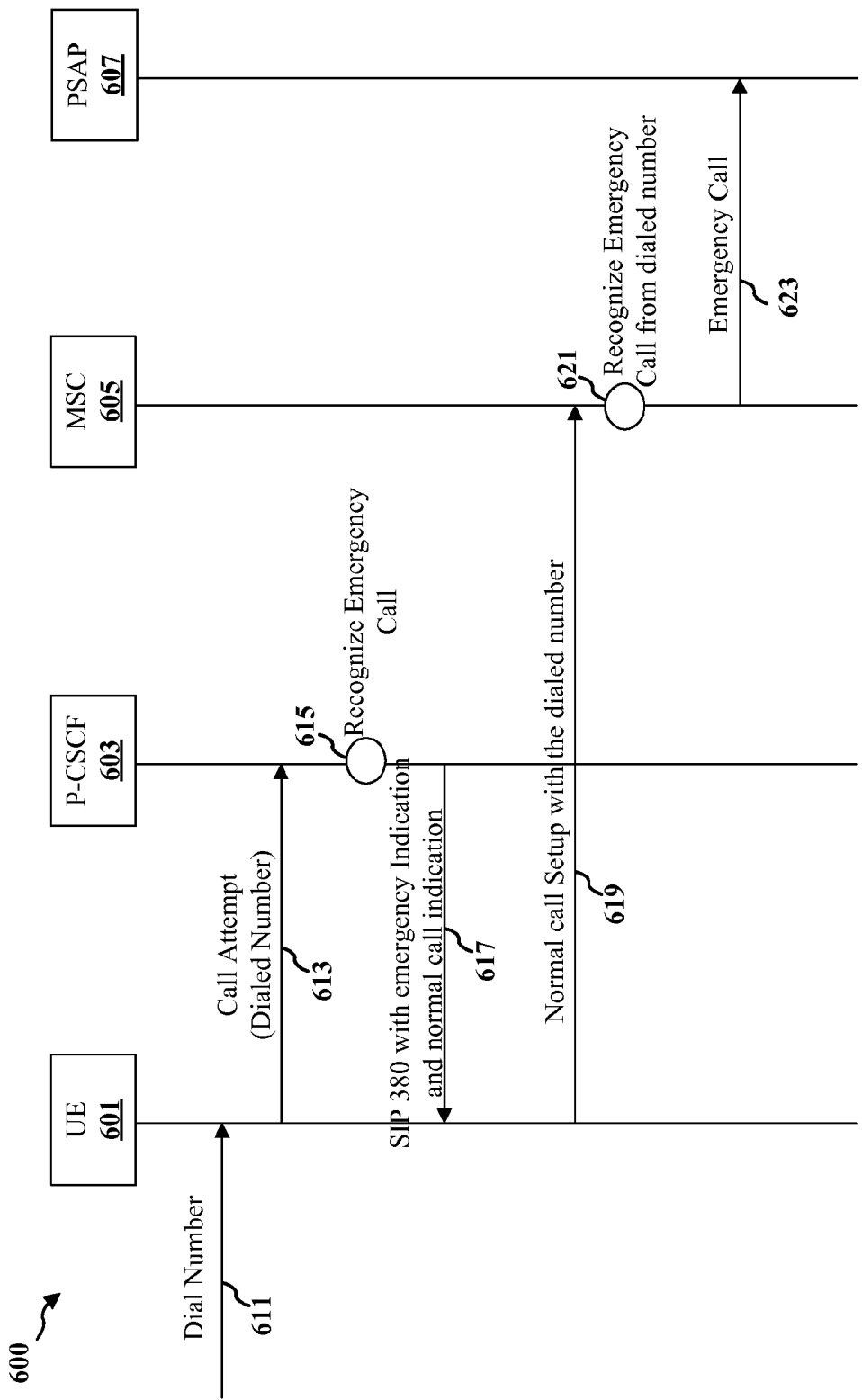
FIG. 6 is a flow diagram illustrating an implementation according to another embodiment of the disclosure.

FIG. 6 is a flow diagram 600 illustrating the second approach of the disclosure. The flow diagram 600 includes a UE 601, a P-CSCF 603, an MSC 605, and a PSAP 607. The UE 601, the P-CSCF 603, the MSC 605, and the PSAP 607 may respectively correspond with the UE 102, the P-CSCF 120 of the IMS network in EPS 100, the MSC 155 of the CS network 150, and the PSAP 130 of FIG. 1. The UE 601 initially attaches to an LTE network that contains an IMS network. At step 611, the user dials a number using the UE 601, where the dialed number includes an emergency number and possibly a prefix and/or postfix number. At step 613, because the UE 601 does not recognize the dialed digits as an emergency number, the UE 601 initiates a call attempt as a normal call with the dialed number via the P-CSCF 603 of the IMS network. At step 615, the P-CSCF 603 recognizes the emergency call by recognizing the dialed digits received in step 613 as an emergency number. At step 617, P-CSCF 603 sends a SIP 380 with an emergency indication and a normal call indication to the UE 601. At this point, the UE 601 may attach to the CS network (e.g., if the UE 601 is not already attached to the CS network). The emergency indication may indicate to the UE 601 that the dialed number is an emergency number. The normal indication may indicate to the UE 601 that the call with the dialed number in the CS network will be a normal call. At step 619, in response to the SIP 380 message with the emergency indication and the normal call indication, the UE 601 sends a normal call setup with the dialed number to the MSC 605 (e.g., by sending a SETUP message), in order to retry the call attempt as a normal call with the dialed number. At step 621, the MSC 605 recognizes the emergency call from the dialed number. At step 623, the MSC 605 sends an emergency call to the PSAP 607. It is noted that the MSC 605 may apply a special treatment indicated by the dialed number, such as support of user privacy (e.g., by not providing a caller identity or a telephone number to the PSAP 607) and/or routing to different PSAPs. It is also noted that the normal call indication in step 617 may include a dialed number in the SIP 380 message in which case the UE 601 includes this dialed number received from the P-CSCF in the normal CS call setup at step 619. A benefit of this addition is that the UE 601 need not store the dialed number following step 611.

According to the third approach, the UE determines whether the CS call is to be a normal call or an emergency call, based on a dialed number and an operator/country, where the dialed number includes an emergency number and possibly a prefix number. In the third approach, the UE behavior may be changed without making any modifications to the network-side behavior. The operator/country characteristic that is used to determine whether a normal CS call is to be used includes the Mobile Country Code (MCC) and the Mobile Network Code (MNC) assigned to the operator of the CS domain (e.g., the operator for CS network 150 in FIG. 1). Typically (e.g., for GSM and WCDMA), a UE can obtain the MCC and the MNC for a serving network from information broadcast by network base stations (e.g., node B 151 in FIG. 1). When the UE initiates a non UE detectable emergency session in the IMS and the network does not support the IMS emergency services, the network responds with a SIP 380 (Alternative Service) response including the conventional contents. That is, a SIP 380 (Alternative Service) response in the third approach includes an emergency indication but does not include an additional new element. Thus, the network-side behavior stays the same. When the UE receives the SIP 380 (Alternative Service) response, the UE will select an appropriate system providing the CS services. If the original dialed number is available and is included in any local emergency number list received from the system providing CS services, or if the original dialed number is not available, the UE sets up a CS emergency call. If the original dialed number is available and is not included in any local emergency number list received from the system providing CS services, and if the MCC or MCC/MNC in use match those of a country or an operator, respectively, that is known (e.g., from pre-configured information in the UE) to require a CS emergency call after SIP 380 (Alternative Service) response to a non UE detectable emergency session, the UE sets up a CS emergency call. If the original dialed number is available and is not included in any local emergency number list received from the system providing CS services, and if the MCC or MCC/MNC in use does not match those of a country or an operator, respectively, that require a CS emergency call after SIP 380 (Alternative Service) response to a non UE detectable emergency session, the UE sets up a CS normal call. Alternatively, in another embodiment, the UE may set up a CS normal call if the MCC or MCC/MNC in use matches those of a country or operator, respectively, for which a CS normal call after a SIP 380 is required, and the UE may set up a CS emergency call if no such match is found.

Figure 7:
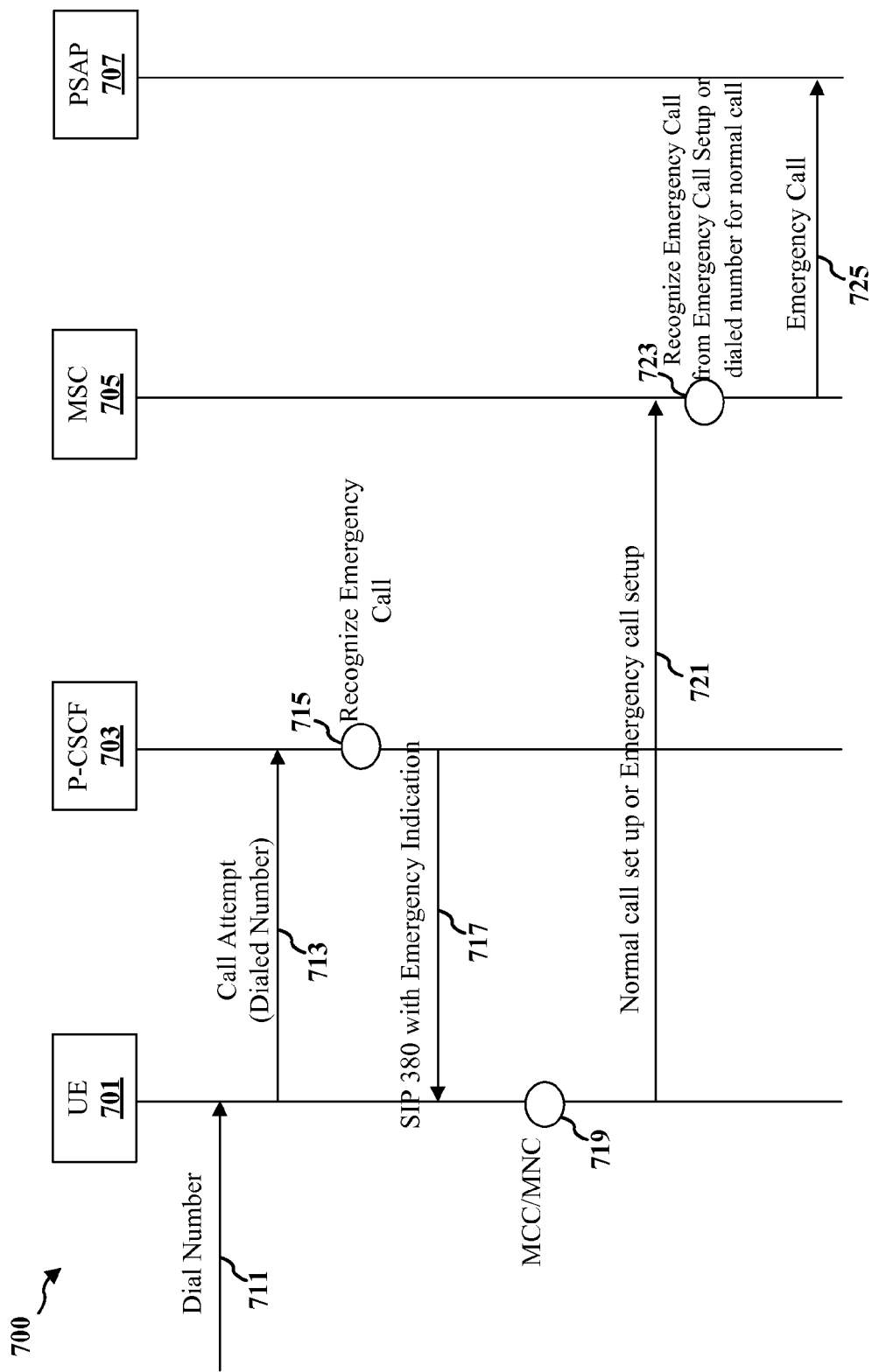
FIG. 7 is a flow diagram illustrating an implementation according to another embodiment of the disclosure.

FIG. 7 is a flow diagram 700 illustrating the third approach of the disclosure. The flow diagram 700 includes a UE 701, a P-CSCF 703, an MSC 705, and a PSAP 707. The UE 701, the P-CSCF 703, the MSC 705, and the PSAP 707 may respectively correspond with the UE 102, the P-CSCF 120 of the IMS network in EPS 100, the MSC 155 of the CS network 150, and the PSAP 130 of FIG. 1. The UE 701 initially attaches to an LTE network that contains an IMS network. At step 711, the user dials a number using the UE 701, where the dialed number includes an emergency number and possibly a prefix and/or postfix number. At step 713, because the UE 701 does not recognizing the number dialed at step 711 as an emergency number, the UE 701 initiates a call attempt as a normal call with the dialed number via the P-CSCF 703 of the IMS network. At step 715, the P-CSCF 703 recognizes the emergency call by recognizing the dialed number received in step 713 as an emergency number. At step 717, P-CSCF 703 sends a SIP 380 with an emergency indication. At step 719, the UE 701 selects a CS network and examines the MCC/MNC for this CS network, as discussed above in order to determine whether to retry the call as a normal call or as an emergency call. At this point, the UE may attach to the CS network (e.g., if the UE is not already attached to the CS network). At step 721, based on the determination at step 719, the UE 701 sends a normal call setup with the dialed number or a emergency call setup (without the dialed number) to the MSC 705, in order to retry the call attempt in the CS network. At step 723, the MSC 705 recognizes the emergency call either from the dialed number if a normal call was attempted at step 721 or from the emergency call itself if the emergency call was attempted at step 721. At step 725, the MSC 705 sends an emergency call to the PSAP 707. It is noted that in the case of a normal call being attempted at step 721, the MSC 705 may apply a special treatment indicated by the dialed number, such as support of user privacy and/or routing to different PSAPs.

Figure 8:
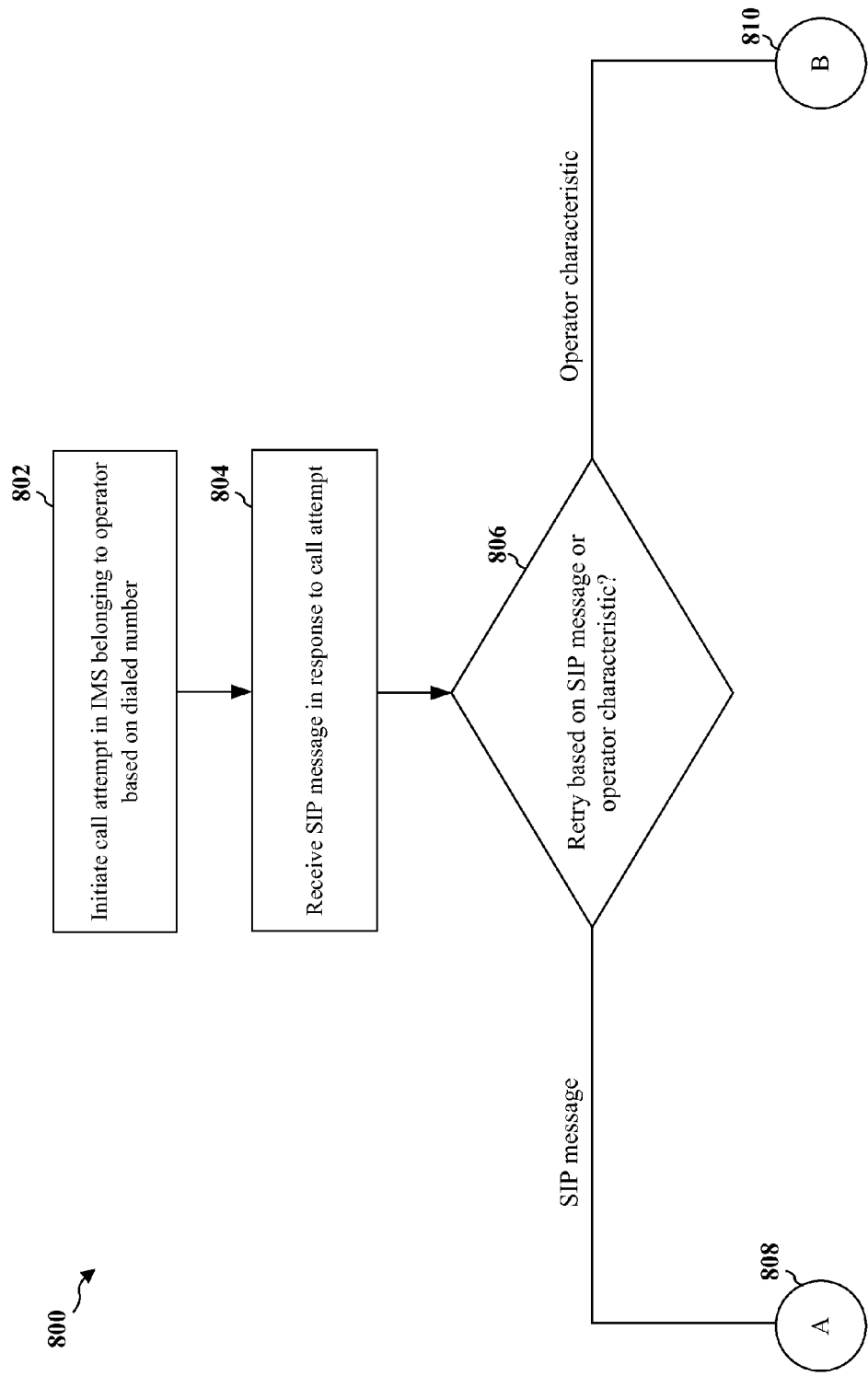
FIG. 8 is a flow chart of a method of wireless communication.
Figure 9:
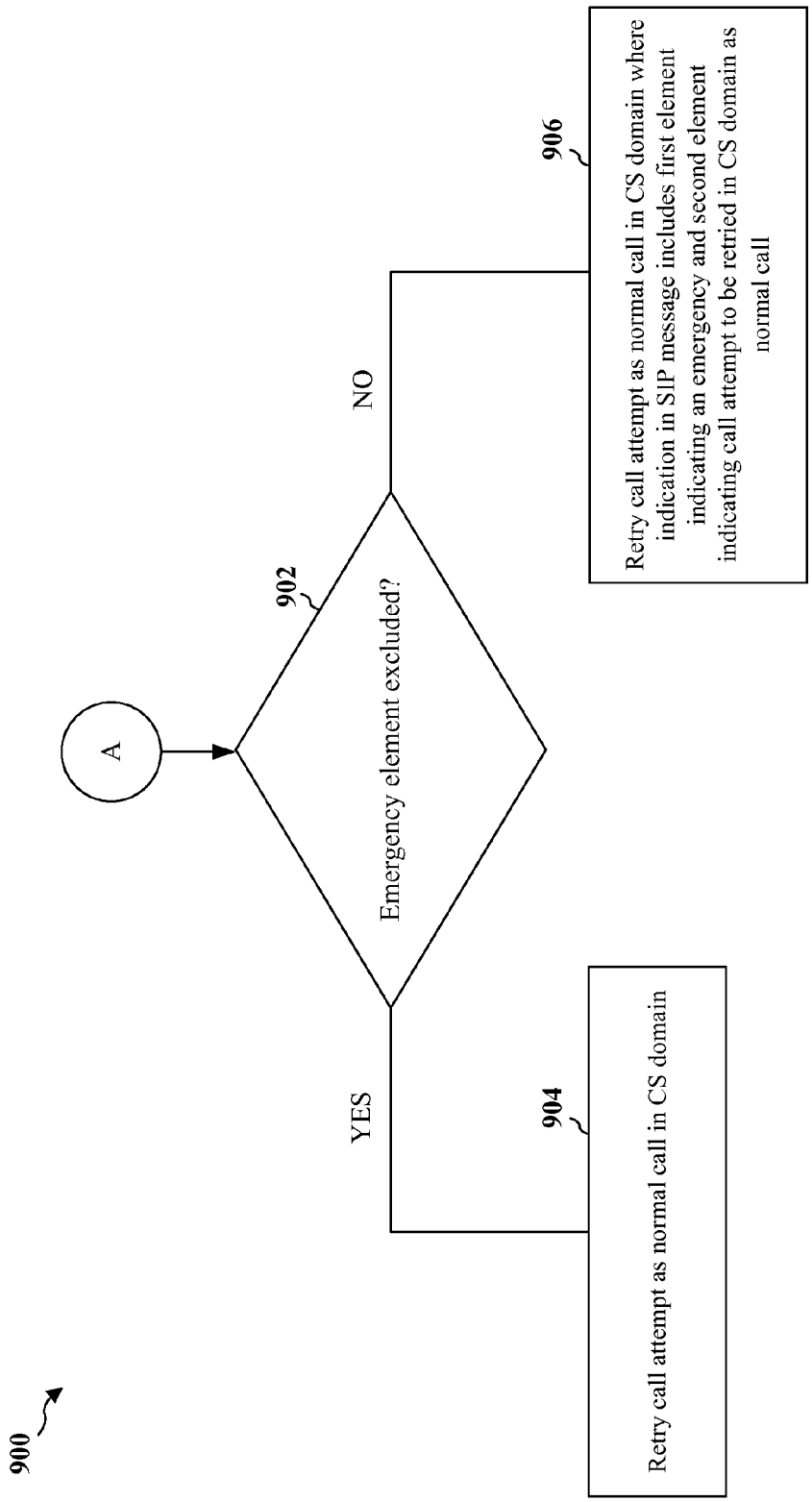
FIG. 9 is a flow chart of a method of wireless communication continuing from the flow chart of FIG. 8
Figure 10:
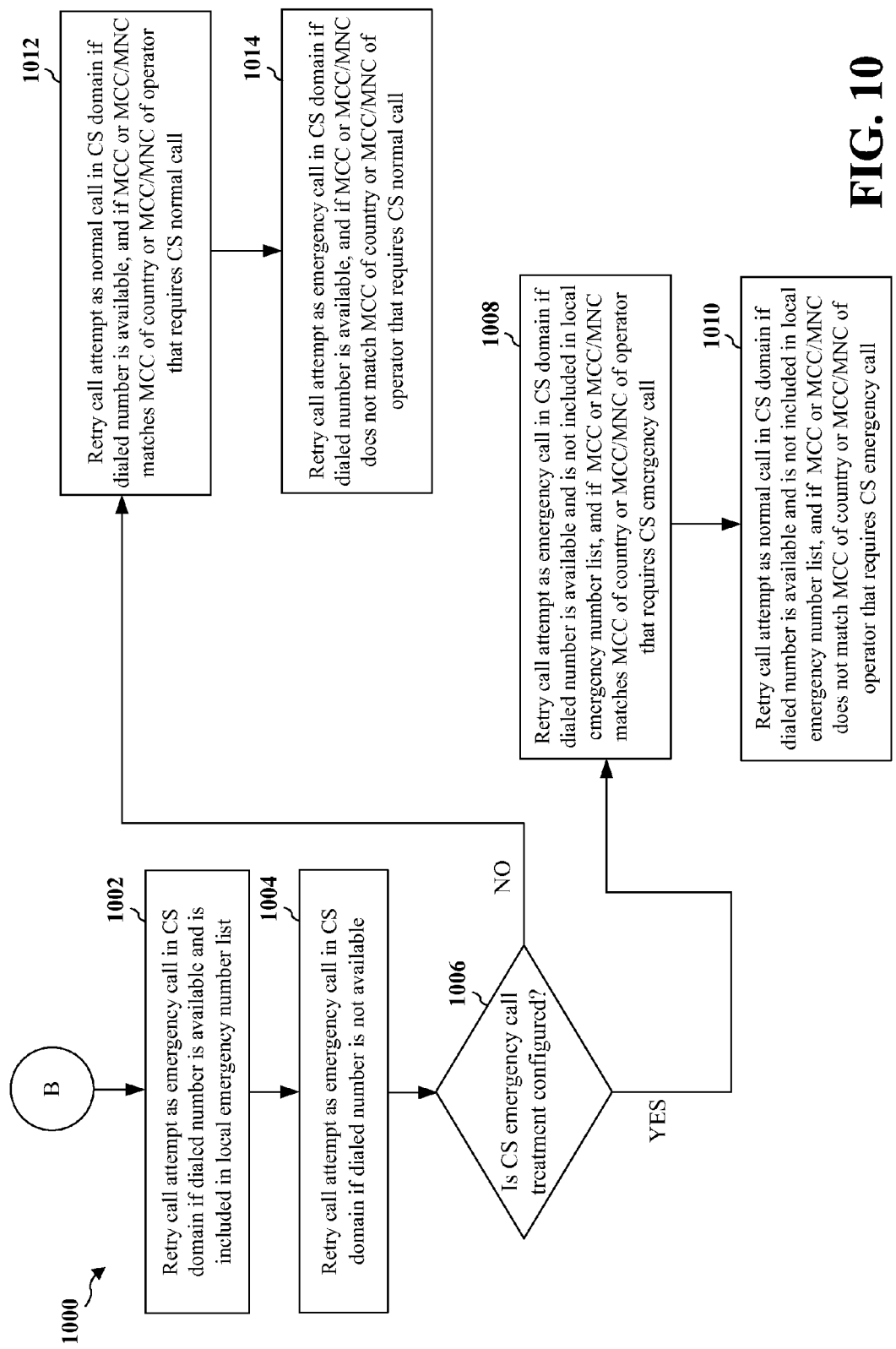
FIG. 10 is a flowchart of a method of wireless communication continuing from the flow chart of FIG. 8.

FIG. 8 is a flow chart 800 of a method of wireless communication. FIG. 9 is a flow chart 900 of a method of wireless communication continuing from the flow chart 800 of FIG. 8. FIG. 10 is a flowchart 1000 of a method of wireless communication continuing from the flow chart 800 of FIG. 8. The method may be performed by a UE. At step 802, the UE initiates a call attempt in an IMS based on a dialed number, where the dialed number includes an emergency number. In an aspect, the UE does not recognize the dialed number as an emergency number. Referring back to FIGS. 4-7, the UE may send the call attempt with the dialed number to the P-CSCF of the IMS as a normal call. The dialed number may further include a prefix and/or postfix number. As discussed supra, for example, if the emergency number that can be dialed is 112, the dialed number may be 184 112 with the prefix number of 184. At step 804, the UE receives a SIP message in response to the call attempt. The UE may receive the SIP message from the IMS when an IMS emergency service is unavailable from the operator. The SIP message may be a SIP 380 message that indicates that the UE shall use an alternative service other than the IMS. Referring back to FIGS. 4-7, the UE may receive the SIP 380 message from the P-CSCF of the IMS. At step 806, the UE determines in response to the SIP message whether to retry the call attempt as a normal call in a CS domain for an operator or as an emergency call in the CS domain for the operator. In an aspect, the determining is based at least in part on either an indication in the SIP message or on a characteristic of the operator of the CS domain.

If the UE considers the indication in the SIP message in step 806 to determine whether to retry the call attempt as the normal call or the emergency call, then the UE proceeds to step 808, which continues in the flowchart 900 of FIG. 9. At step 902, the UE determines whether the indication in the SIP 380 excludes an element indicating an emergency associated with the dialed number. If the indication in the SIP message excludes the element indicating an emergency associated with the dialed number, then at step 904, the UE retries the call attempt as the normal call in the CS domain. For example, as discussed supra, if the UE receives a SIP 380 message without an indication that the dialed number is an emergency number, then the UE retries the call attempt as the normal call in the CS domain. Referring back to FIG. 5, when the UE 501 receives the SIP 380 message without the emergency indication, then the UE 501 sends a normal call setup with the dialed number to the MSC 505 of the CS network, in order to retry the call attempt as a normal call with the dialed number.

If the indication in the SIP message does not exclude (e.g., the SIP message includes) the element indicating an emergency associated with the dialed number, then the UE performs step 906. At step 906, the UE retries the call attempt as the normal call in the CS domain if the indication in the SIP message includes a first element indicating an emergency associated with the dialed number and a second element indicating that the call attempt is to be retried in the CS domain as the normal call. The second element may include digits to be included for the normal call in the CS domain. For example, as discussed supra, if the UE receives a SIP 380 message with an indication that the dialed number is an emergency number and an additional new element indicating that the call in the CS domain will be a normal call, then the UE retries the call attempt as the normal call in the CS domain. The additional new element in the 380 message may include digits for the normal call in the CS domain. Referring back to FIG. 6, when the UE 601 receives the SIP 380 message with the emergency indication and the normal call indication, then the UE 601 sends a normal call setup with the dialed number to the MSC 605 of the CS network, in order to retry the call attempt as a normal call with the dialed number.

If the UE considers the characteristic of the operator in step 806 to determine whether to retry the call attempt as the normal call or the emergency call, then the UE proceeds to step 810, which continues in the flowchart 1000 of FIG. 10. At step 1002, the UE retries the call attempt as the emergency call in the CS domain if the dialed number is available and is included in a local emergency number list received from the CS domain. At step 1004, the UE retries the call attempt as the emergency call in the CS domain if the dialed number is not available. At step 1006, if neither step 1002 nor step 1004 results in a call attempt, the UE verifies whether CS emergency call treatment is configured in the UE. If the CS emergency call treatment is configured in the UE, at step 1008, the UE retries the call attempt as the emergency call in the CS domain if the dialed number is available and is not included in the local emergency number list received from the CS domain, and if the MCC or the MCC/MNC for the CS operator matches an MCC of a country or an MCC/MNC of an operator that requires a CS emergency call in response to the SIP message. At step 1010, the UE retries the call attempt as the normal call in the CS domain if the dialed number is available and is not included in the local emergency number list received from the CS domain, and if the MCC or the MCC/MNC does not match the MCC of a country or the MCC/MNC of an operator that requires a CS emergency call in response to the SIP message. If the UE verifies at step 1006 that CS emergency call treatment is not configured in the UE, then at step 1012, the UE retries the call attempt as the normal call in the CS domain if the dialed number is available and is not included in the local emergency number list received from the CS domain, and if the MCC or the MCC/MNC for the CS operator matches an MCC of a country or an MCC/MNC of an operator that requires a CS normal call in response to the SIP message. At step 1014, the UE retries the call attempt as the emergency call in the CS domain if the dialed number is available and is not included in the local emergency number list received from the CS domain, and if the MCC or the MCC/MNC does not match the MCC of a country or the MCC/MNC of an operator that requires a CS normal call in response to the SIP message. Referring back to FIG. 7, when the UE 701 receives the SIP 380 message with the emergency indication, the UE 701 examines the MCC/MNC. Based on the examination of the MCC/MNC, the UE 701 determines to send a normal call setup with the dialed number or an emergency call setup (without the dialed number) to the MSC 705 of the CS network, in order to retry the call attempt as a normal call or an emergency call. It is noted that steps 1002, 1004, 1008, and 1010 may be grouped as one approach and steps 1002, 1004, 1012, and 1014 may be grouped as another approach, according to one example.

Figure 11:
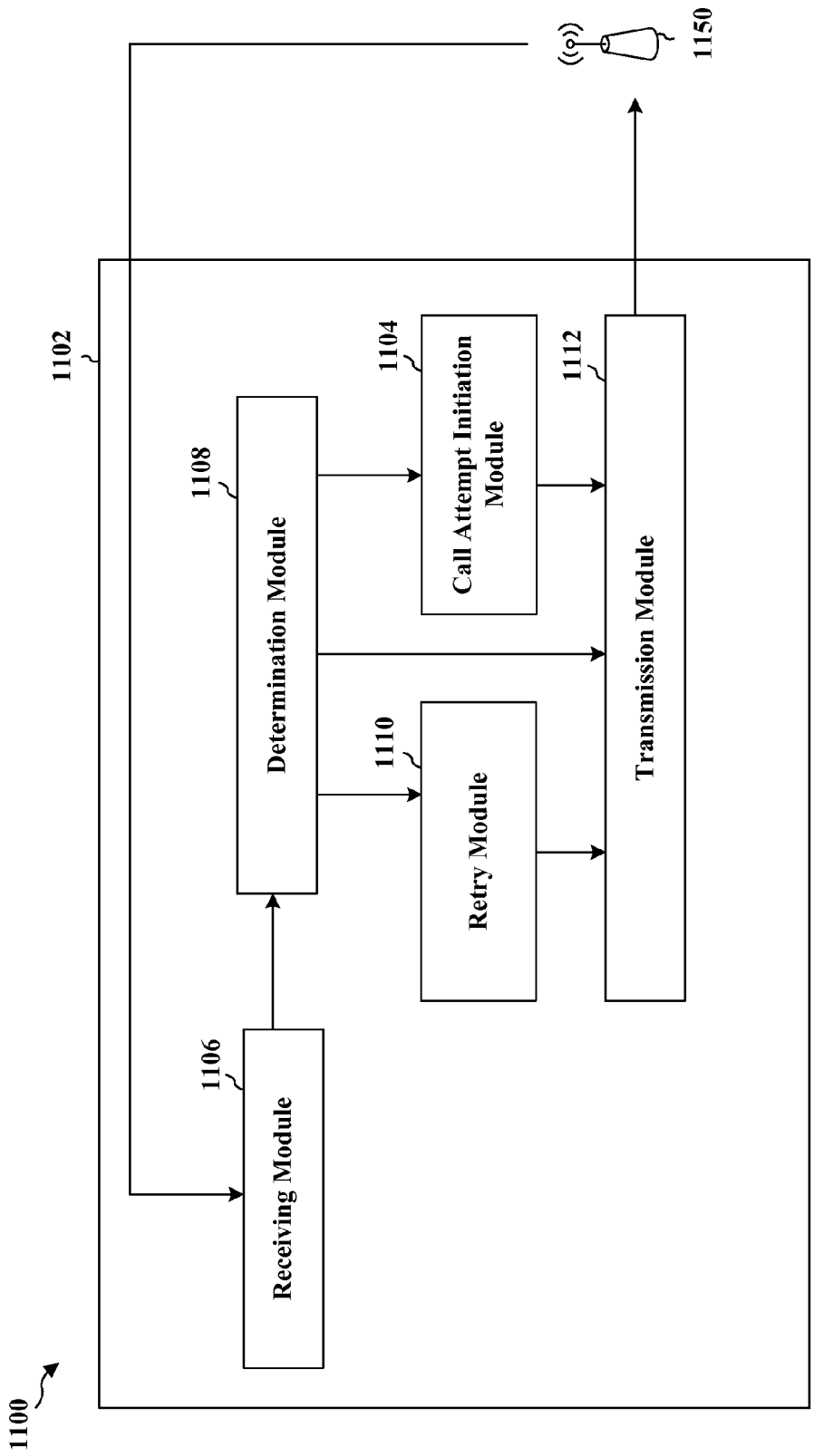
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE. The apparatus includes a call attempt initiation module 1104 that initiates a call attempt in an IMS belonging to an operator based on a dialed number, the dialed number including an emergency number, a receiving module 1106 that receives a SIP message in response to the call attempt, and a determination module 1108 that determines in response to the SIP message whether to retry the call attempt as a normal call in a CS domain or as an emergency call in the CS domain. In an aspect, the determining is based at least in part on either an indication in the SIP message or on a characteristic of the operator.

The apparatus further includes a retry module 1110 that retries the call attempt either as the normal call or as the emergency call, and communicates with a transmission module 1112 to retry the call attempt. In an aspect, the retry module 1110 retries the call attempt as the normal call in the CS domain, where the indication in the SIP message includes exclusion of an element indicating an emergency associated with the dialed number. In an aspect, the retry module 1110 retries the call attempt as the normal call in the CS domain, where the indication in the SIP message includes a first element indicating an emergency associated with the dialed number and a second element indicating that the call attempt is to be retried in the CS domain as the normal call. The retry module 1110 retries the call attempt as the emergency call in the CS domain if the dialed number is available and is included in a local emergency number list received from the CS domain, retries the call attempt as the emergency call in the CS domain if the dialed number is not available, retries the call attempt as the emergency call in the CS domain if the dialed number is available and is not included in the local emergency number list received from the CS domain, and if the MCC or an MCC/MNC (for the CS domain) matches an MCC of a country or an MCC/MNC of an operator that requires a CS emergency call in response to the SIP message, and retries the call attempt as the normal call in the CS domain if the dialed number is available and is not included in the local emergency number list received from the CS domain, and if the MCC or the MCC/MNC does not match the MCC of a country or the MCC/MNC of an operator that requires a CS emergency call in response to the SIP message. The retry module 1110 retries the call attempt as the emergency call in the CS domain if the dialed number is available and is included in a local emergency number list received from the CS domain, retries the call attempt as the emergency call in the CS domain if the dialed number is not available, retries the call attempt as the normal call in the CS domain if the dialed number is available and is not included in the local emergency number list received from the CS domain, and if the MCC or an MCC/MNC matches an MCC of a country or an MCC/MNC of an operator that requires a CS normal call in response to the SIP message, and retries the call attempt as the emergency call in the CS domain if the dialed number is available and is not included in the local emergency number list received from the CS domain, and if the MCC or the MCC/MNC does not match the MCC of a country or the MCC/MNC of an operator that requires a CS normal call in response to the SIP message.

The apparatus may include additional modules that perform each of the steps of the algorithm in the aforementioned flow charts of FIGS. 8-10. As such, each step in the aforementioned flow charts of FIGS. 8-10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
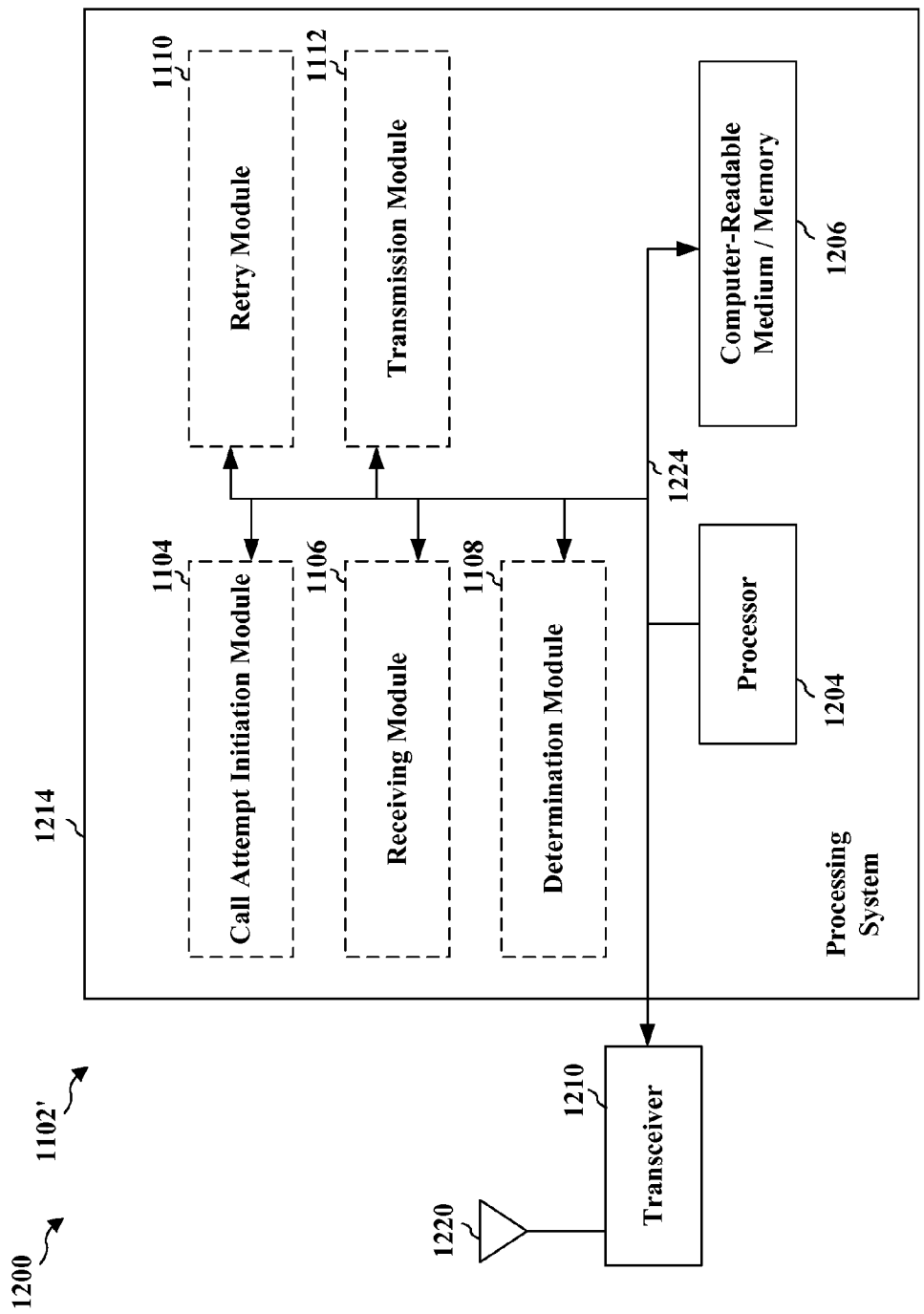
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The apparatus 1102' may be representative of the UE 102 in FIG. 1, each of the UEs 206 in FIG. 2, the UE 350 in FIG. 3 and each of the UEs 401, 501, 601 and 701 in FIGS. 4-7. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1106. In addition, the transceiver 1210 receives information from the processing system 1214, specifically the transmission module 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, 1108, 1110, and 1112. The modules may be software modules running in the processor 1204, resident/stored in the computer readable medium/memory 1206, one or more hardware modules coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for initiating a call attempt in an IMS belonging to an operator based on a dialed number, the dialed number including an emergency number, means for receiving a SIP message in response to the call attempt, and means for determining in response to the SIP message whether to retry the call attempt as a normal call in a CS domain or as an emergency call in the CS domain. In an aspect, the determining is based at least in part on either an indication in the SIP message or on a characteristic of the operator. The apparatus 1102/1102' for wireless communication further includes means for retrying the call attempt as the normal call in the CS domain, where the indication includes exclusion of an element indicating an emergency associated with the dialed number. The apparatus 1102/1102' for wireless communication further includes means for retrying the call attempt as the normal call in the CS domain, where the indication includes a first element indicating an emergency associated with the dialed number and a second element indicating that the call attempt is to be retried in the CS domain as the normal call.

The apparatus 1102/1102' for wireless communication further includes means for retrying the call attempt as the emergency call in the CS domain if the dialed number is available and is included in a local emergency number list received from the CS domain, means for retrying the call attempt as the emergency call in the CS domain if the dialed number is not available, means for retrying the call attempt as the emergency call in the CS domain if the dialed number is available and is not included in the local emergency number list received from the CS domain, and if the MCC or an MCC/MNC matches an MCC of a country or an MCC/MNC of an operator that requires a CS emergency call in response to the SIP message, and means for retrying the call attempt as the normal call in the CS domain if the dialed number is available and is not included in the local emergency number list received from the CS domain, and if the MCC or the MCC/MNC does not match the MCC of a country or the MCC/MNC of an operator that requires a CS emergency call in response to the SIP message. The apparatus 1102/1102' for wireless communication further includes means for retrying the call attempt as the emergency call in the CS domain if the dialed number is available and is included in a local emergency number list received from the CS domain, means for retrying the call attempt as the emergency call in the CS domain if the dialed number is not available, means for retrying the call attempt as the normal call in the CS domain if the dialed number is available and is not included in the local emergency number list received from the CS domain, and if the MCC or an MCC/MNC matches an MCC of a country or an MCC/MNC of an operator that requires a CS normal call in response to the SIP message, and means for retrying the call attempt as the emergency call in the CS domain if the dialed number is available and is not included in the local emergency number list received from the CS domain, and if the MCC or the MCC/MNC does not match the MCC of a country or the MCC/MNC of an operator that requires a CS normal call in response to the SIP message.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
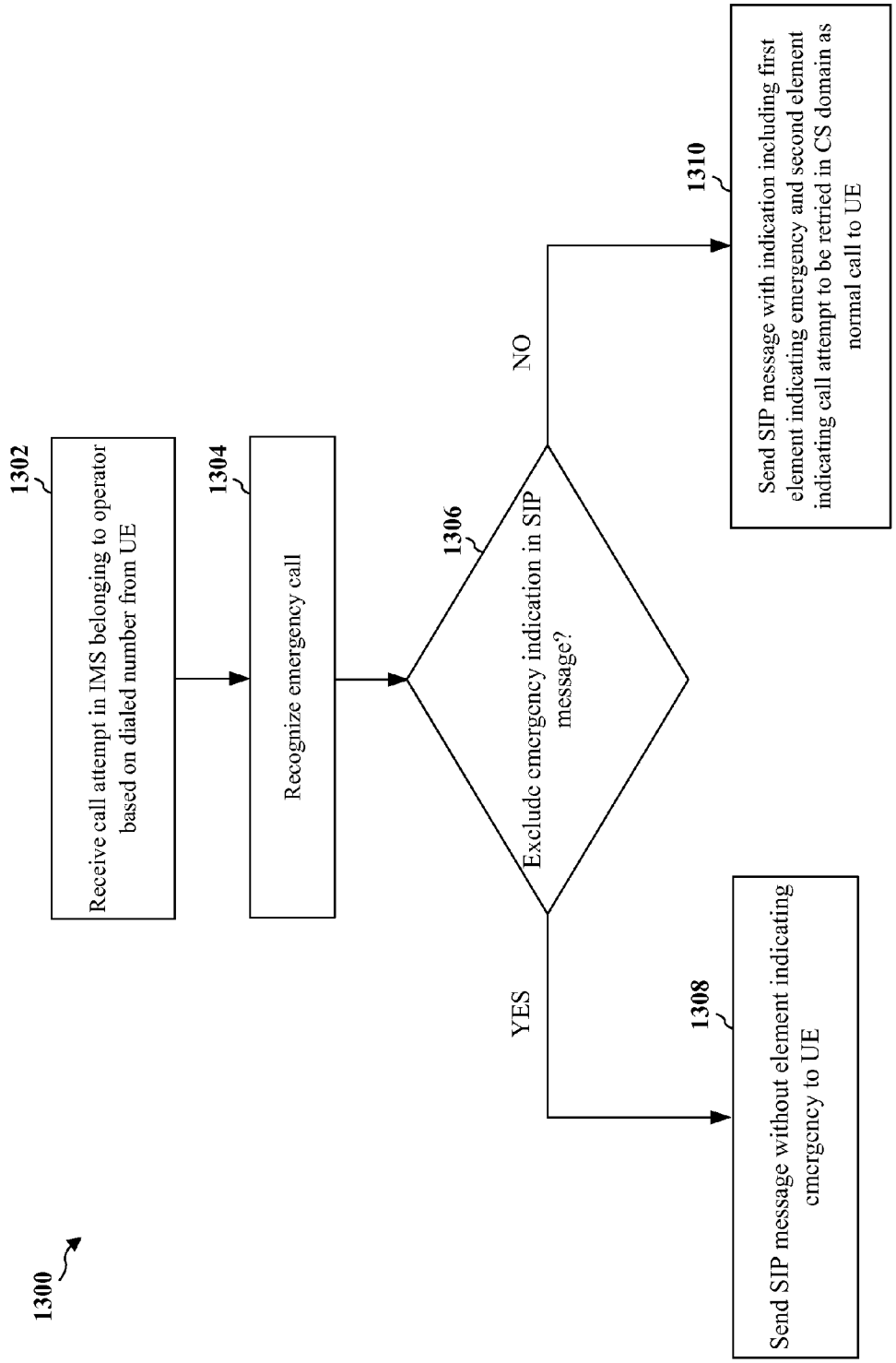
FIG. 13 is a flow chart of a method of wireless communication.

FIG. 13 is a flow chart 1300 of a method of wireless communication. The method may be performed by a P-CSCF—e.g. by P-CSCF 120 in FIG. 1, P-CSCF 503 in FIG. 5 or by P-CSCF 603 in FIG. 6. At step 1302, the P-CSCF receives a call attempt from a UE (e.g., an originating UE), where the call attempt is based on a dialed number at the UE and the dialed number includes an emergency number. In an aspect, the UE does not recognize the dialed number as an emergency number. Referring back to FIGS. 4-7, the UE may send the call attempt with the dialed number to the P-CSCF of the IMS as a normal call. The dialed number may further include a prefix and/or postfix number. As discussed supra, for example, if the emergency number that can be dialed is 112, the dialed number may be 184 112 with the prefix number of 184. At step 1304, the P-CSCF recognizes an emergency call by recognizing the dialed number as the emergency call.

At step 1306, the P-CSCF may determine that the call should be reattempted by the UE (e.g., the originating UE) in the CS domain (e.g., using a GSM or WCDMA network) and may further determine whether the call should be reattempted as a normal call and not as an emergency call. The P-CSCF may make such determinations based on a need for the CS network in which the emergency call will be reattempted to have access to the original dialed digits—e.g. in order to route the call to a particular destination PSAP and/or to provide some additional service such as caller privacy associated with any prefix or postfix digits that were dialed. Accordingly, at step 1306, the P-CSCF determines to return a SIP message to the originating UE (e.g. a SIP 380 message) and determines whether to exclude an emergency indication in the SIP message or not. If the P-CSCF determines to exclude an emergency indication in the SIP message, at step 1308, the P-CSCF sends the UE the SIP message without an element indicating an emergency associated with the dialed number. In an aspect, the UE retries the call attempt as the normal call in the CS domain after receiving the SIP message without an element indicating an emergency associated with the dialed number. For example, referring back to FIG. 5, at step 515, the P-CSCF 503 recognizes the emergency call by recognizing the dialed emergency number received in step 513, and at step 517, sends a SIP 380 without an emergency indication to the UE 501. Referring back to FIG. 5, when the UE 501 receives the SIP 380 message without the emergency indication, then the UE 501 sends a normal call setup with the dialed number to the MSC 505 of the CS network, in order to retry the call attempt as a normal call with the dialed number. For example, as discussed supra, if the UE receives a SIP 380 message without an indication that the dialed number is an emergency number, then the UE retries the call attempt as the normal call in the CS domain.

If the P-CSCF determines not to exclude an emergency indication in the SIP message, at step 1310, the P-CSCF sends the UE the SIP message with an indication including a first element indicating an emergency associated with the dialed number and a second element indicating that the call attempt is to be retried in the CS domain as the normal call. The second element may include digits to be included for the normal call in the CS domain. In an aspect, the UE retries the call attempt as the normal call in the CS domain if the indication in the SIP message includes the first element indicating the emergency associated with the dialed number and the second element indicating that the call attempt is to be retried in the CS domain as the normal call. For example, referring back to FIG. 6, at step 615, the P-CSCF 603 recognizes the emergency call by recognizing the dialed digits received in step 613 as an emergency number, and at step 617, sends a SIP 380 with an emergency indication and a normal call indication to the UE 601. Referring back to FIG. 6, when the UE 601 receives the SIP 380 message with the emergency indication and the normal call indication, then the UE 601 sends a normal call setup with the dialed number to the MSC 605 of the CS network, in order to retry the call attempt as a normal call with the dialed number. For example, as discussed supra, if the UE receives a SIP 380 message with an indication that the dialed number is an emergency number and an additional new element indicating that the call in the CS domain will be a normal call, then the UE retries the call attempt as the normal call in the CS domain. The additional new element in the 380 message may include digits for the normal call in the CS domain.

Figure 14:
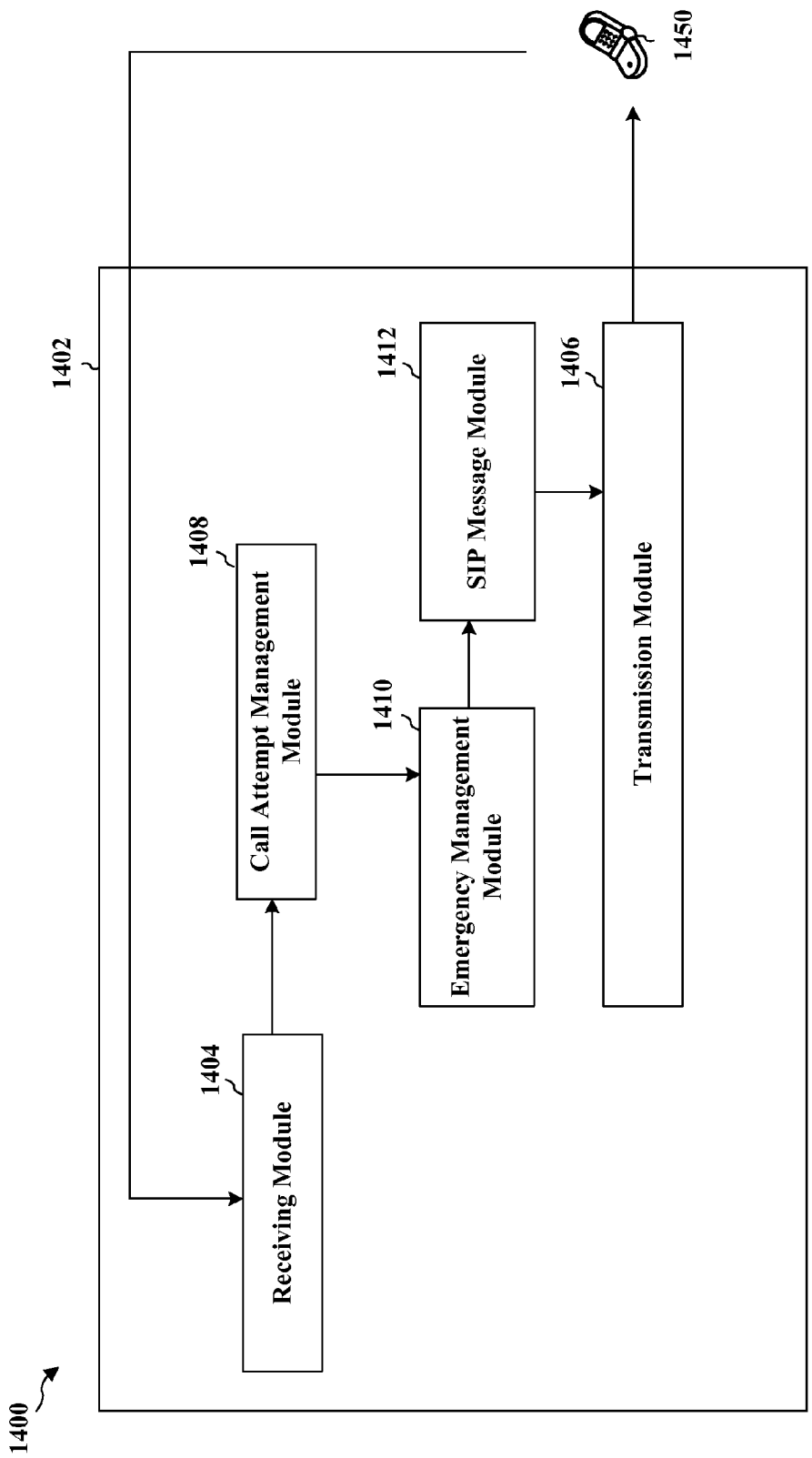
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a P-CSCF—e.g. the P-CSCF 120 in FIG. 1, the P-CSCF 503 in FIG. 5 or the P-CSCF 603 in FIG. 6. The apparatus includes a receiving module 1404, a transmission module 1406, a call attempt management module 1408, an emergency call management module 1410, and a SIP message module 1412.

The call attempt management module 1408 receives, through the receiving module 1404, a call attempt from the UE 1450, where the call attempt is based on a dialed number at the UE 1450 and the dialed number includes an emergency number. In an aspect, the UE 1450 does not recognize the dialed number as an emergency number. The emergency call management module 1410 recognizes an emergency call by recognizing the dialed number as the emergency call. The SIP message module 1412 determines whether to exclude an emergency indication in a SIP message or not. If the SIP message module 1412 determines to exclude an emergency indication in the SIP message, the SIP message module 1412 sends, via the transmission module 1406, the SIP message without an element indicating an emergency associated with the dialed number, to the UE 1450. If the SIP message module 1412 determines not to exclude an emergency indication in the SIP message, the SIP message module 1412 sends, via the transmission module 1406, the SIP message with an indication including a first element indicating an emergency associated with the dialed number and a second element indicating that the call attempt is to be retried in the CS domain as the normal call, to the UE 1450. The second element may include digits to be included for the normal call in the CS domain.

The apparatus may include additional modules that perform each of the steps of the algorithm in the aforementioned flow chart of FIG. 13. As such, each step in the aforementioned flow chart of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
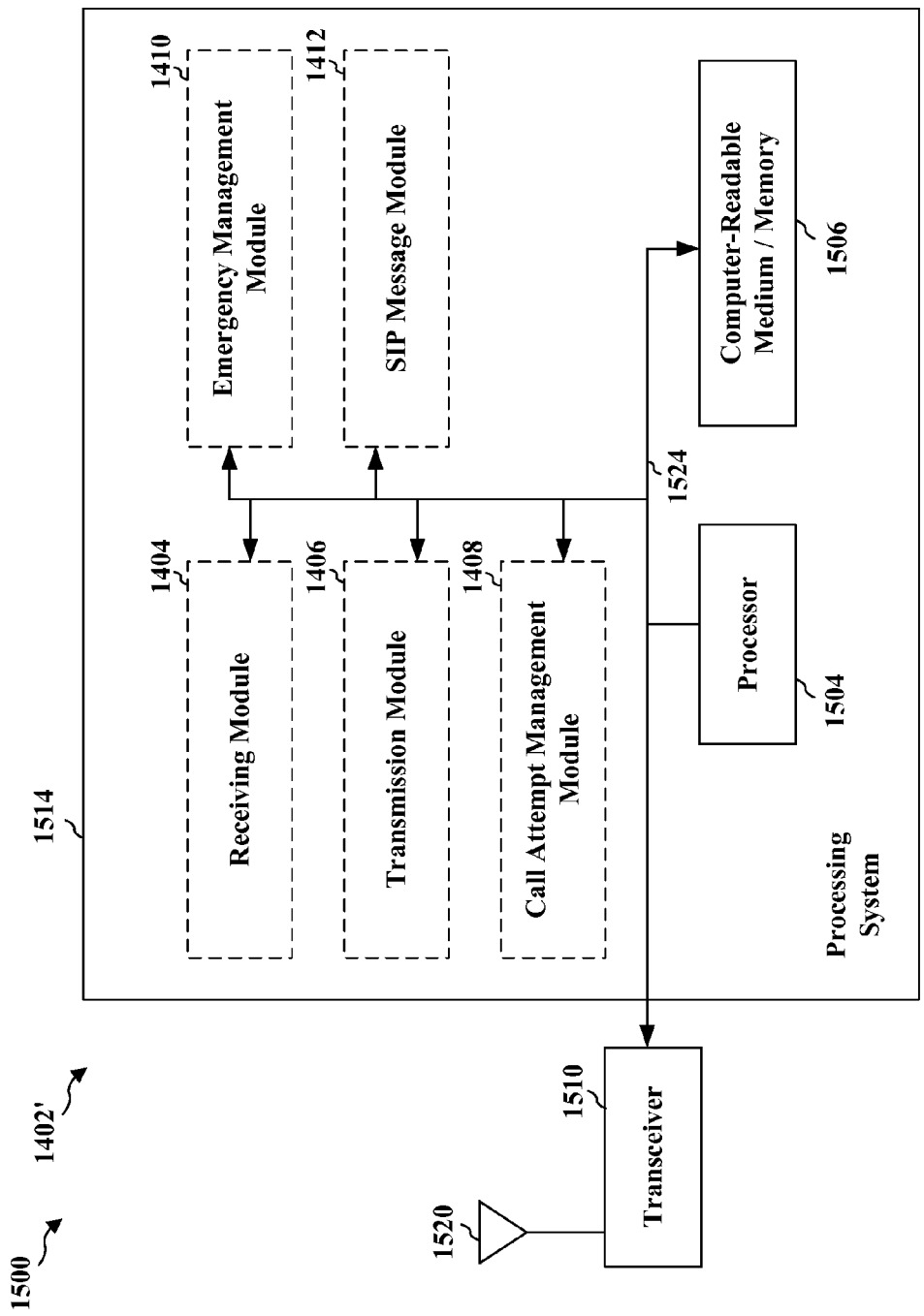
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The apparatus 1402' may be for a P-CSCF—e.g. the P-CSCF 120 in FIG. 1, the P-CSCF 503 in FIG. 5 or the P-CSCF 603 in FIG. 6. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, 1412, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 may be coupled to one or more antennas 1520 and/or may connect to one or more wireline links (not shown in FIG. 15) such as a link to an E-CSCF (e.g. E-CSCF 122) and/or a link to a PDN Gateway (e.g. PDN Gateway 118). The transceiver 1510 provides a means for communicating with various other apparatus over a transmission medium. The transceiver 1510 receives a signal from the one or more antennas 1520 and/or from one or more wireline links, extracts information from the received signal, and provides the extracted information to the processing system 1514, specifically the receiving module 1404. In addition, the transceiver 1510 receives information from the processing system 1514, specifically the transmission module 1406, and based on the received information, generates a signal to be applied to the one or more antennas 1520 and/or to one or more wireline links. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1404, 1406, 1408, 1410, and 1412. The modules may be software modules running in the processor 1504, resident/stored in the computer readable medium/memory 1506, one or more hardware modules coupled to the processor 1504, or some combination thereof.

In one configuration, the apparatus 1402/1402' for wireless communication includes means for receiving a call attempt from a UE, where the call attempt is based on a dialed number at the UE and the dialed number includes an emergency number, means for recognizing an emergency call by recognizing the dialed number as the emergency call, means for determining whether to exclude an emergency indication in a SIP message or not, means for sending the UE the SIP message without an element indicating an emergency associated with the dialed number if the emergency indication is excluded in the SIP message, and means for sending the UE the SIP message with an indication including a first element indicating an emergency associated with the dialed number and a second element indicating that the call attempt is to be retried in the CS domain as the normal call if the emergency indication is not excluded in the SIP message. The aforementioned means may be one or more of the aforementioned modules of the apparatus 1402 and/or the processing system 1514 of the apparatus 1402' configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication, comprising:
    initiating a call attempt in an internet protocol multimedia subsystem (IMS) based on a dialed number, the dialed number comprising an emergency number;
    receiving a session initiation protocol (SIP) message in response to the call attempt; and
    determining in response to the SIP message whether to retry the call attempt as a normal call in a circuit-switched (CS) domain for an operator or as an emergency call in the CS domain for the operator, wherein the determining is based at least in part on either an indication in the SIP message or on a characteristic of the operator,
    wherein the characteristic comprises a Mobile Country Code (MCC) and a Mobile Network Code (MNC) for the operator, and the method further comprises:
    retrying the call attempt as the emergency call in the CS domain if the dialed number is available and is included in a local emergency number list received from the CS domain;
    retrying the call attempt as the emergency call in the CS domain if the dialed number is not available;
    retrying the call attempt as the emergency call in the CS domain if the dialed number is available and is not included in the local emergency number list received from the CS domain, and if the MCC or the MCC/MNC matches an MCC of a country or an MCC/MNC of an operator that requires a CS emergency call in response to the SIP message; and retrying the call attempt as the normal call in the CS domain if the dialed number is available and is not included in the local emergency number list received from the CS domain, and if the MCC or the MCC/MNC does not match the MCC of a country or the MCC/MNC of an operator that requires a CS emergency call in response to the SIP message.

2. The method of claim 1, wherein the dialed number further includes prefix digits.

3. The method of claim 1, wherein the SIP message is received when an IMS emergency service is unavailable.

4. The method of claim 1, wherein the indication comprises exclusion of an element indicating an emergency associated with the dialed number, and the method further comprises:
retrying the call attempt as the normal call in the CS domain.

5. The method of claim 1, wherein the indication comprises a first element indicating an emergency associated with the dialed number and a second element indicating that the call attempt is to be retried in the CS domain as the normal call, and the method further comprises:
retrying the call attempt as the normal call in the CS domain.

6. The method of claim 5, wherein the indication further comprises a third element comprising digits to be included for the normal call in the CS domain.

7. The method of claim 6, wherein the second element and third element are the same element.

8. A method for wireless communication, comprising:
initiating a call attempt in an internet protocol multimedia subsystem (IMS) based on a dialed number, the dialed number comprising an emergency number;
receiving a session initiation protocol (SIP) message in response to the call attempt; and
determining in response to the SIP message whether to retry the call attempt as a normal call in a circuit-switched (CS) domain for an operator or as an emergency call in the CS domain for the operator, wherein the determining is based at least in part on either an indication in the SIP message or on a characteristic of the operator,
wherein the characteristic comprises a Mobile Country Code (MCC) and a Mobile Network Code (MNC) for the operator, and the method further comprises:
retrying the call attempt as the emergency call in the CS domain if the dialed number is available and is included in a local emergency number list received from the CS domain;
retrying the call attempt as the emergency call in the CS domain if the dialed number is not available;
retrying the call attempt as the normal call in the CS domain if the dialed number is available and is not included in the local emergency number list received from the CS domain, and if the MCC or the MCC/MNC matches an MCC of a country or an MCC/MNC of an operator that requires a CS normal call in response to the SIP message; and
retrying the call attempt as the emergency call in the CS domain if the dialed number is available and is not included in the local emergency number list received from the CS domain, and if the MCC or the MCC/MNC does not match the MCC of a country or the MCC/MNC of an operator that requires a CS normal call in response to the SIP message.

9. An apparatus for wireless communication, comprising:
means for initiating a call attempt in an internet protocol multimedia subsystem (IMS) based on a dialed number, the dialed number comprising an emergency number;
means for receiving a session initiation protocol (SIP) message in response to the call attempt; and
means for determining in response to the SIP message whether to retry the call attempt as a normal call in a circuit-switched (CS) domain for an operator or as an emergency call in the CS domain for the operator, wherein the determining is based at least in part on either an indication in the SIP message or on a characteristic of the operator,
wherein the characteristic comprises a Mobile Country Code (MCC) and a Mobile Network Code (MNC) for the operator, and the apparatus further comprises:
means for retrying the call attempt as the emergency call in the CS domain if the dialed number is available and is included in a local emergency number list received from the CS domain;
means for retrying the call attempt as the emergency call in the CS domain if the dialed number is not available;
means for retrying the call attempt as the emergency call in the CS domain if the dialed number is available and is not included in the local emergency number list received from the CS domain, and if the MCC or the MCC/MNC matches an MCC of a country or an MCC/MNC of an operator that requires a CS emergency call in response to the SIP message; and
means for retrying the call attempt as the normal call in the CS domain if the dialed number is available and is not included in the local emergency number list received from the CS domain, and if the MCC or the MCC/MNC does not match the MCC of a country or the MCC/MNC of an operator that requires a CS emergency call in response to the SIP message.

10. The apparatus of claim 9, wherein the dialed number further includes prefix digits.

11. The apparatus of claim 9, wherein the SIP message is received when an IMS emergency service is unavailable.

12. The apparatus of claim 9, wherein the indication comprises exclusion of an element indicating an emergency associated with the dialed number, and the apparatus further comprises:
means for retrying the call attempt as the normal call in the CS domain.

13. The apparatus of claim 9 wherein the indication comprises a first element indicating an emergency associated with the dialed number and a second element indicating that the call attempt is to be retried in the CS domain as the normal call, and the apparatus further comprises:
means for retrying the call attempt as the normal call in the CS domain.

14. The apparatus of claim 13, wherein the indication further comprises a third element comprising digits to be included for the normal call in the CS domain.

15. The apparatus of claim 14, wherein the second element and third element are the same element.

16. An apparatus for wireless communication, comprising:
means for initiating a call attempt in an internet protocol multimedia subsystem (IMS) based on a dialed number, the dialed number comprising an emergency number;
means for receiving a session initiation protocol (SIP) message in response to the call attempt; and
means for determining in response to the SIP message whether to retry the call attempt as a normal call in a circuit-switched (CS) domain for an operator or as an emergency call in the CS domain for the operator, wherein the determining is based at least in part on either an indication in the SIP message or on a characteristic of the operator, wherein the characteristic comprises a Mobile Country Code (MCC) and a Mobile Network Code (MNC) for the operator, and the apparatus further comprises:

means for retrying the call attempt as the emergency call in the CS domain if the dialed number is available and is included in a local emergency number list received from the CS domain;

means for retrying the call attempt as the emergency call in the CS domain if the dialed number is not available;

means for retrying the call attempt as the normal call in the CS domain if the dialed number is available and is not included in the local emergency number list received from the CS domain, and if the MCC or the MCC/MNC matches an MCC of a country or an MCC/MNC of an operator that requires a CS normal call in response to the SIP message; and means for retrying the call attempt as the emergency call in the CS domain if the dialed number is available and is not included in the local emergency number list received from the CS domain, and if the MCC or the MCC/MNC does not match the MCC of a country or the MCC/MNC of an operator that requires a CS normal call in response to the SIP message.

17. An apparatus for wireless communication, comprising:
a memory; and
at least one processor coupled to the memory and configured to:
  initiate a call attempt in an internet protocol multimedia subsystem (IMS) based on a dialed number, the dialed number comprising an emergency number;
  receive a session initiation protocol (SIP) message in response to the call attempt; and
  determine in response to the SIP message whether to retry the call attempt as a normal call in a circuit-switched (CS) domain for an operator or as an emergency call in the CS domain for the operator, wherein the determining is based at least in part on either an indication in the SIP message or on a characteristic of the operator,
wherein the characteristic comprises a Mobile Country Code (MCC) and a Mobile Network Code (MNC) for the operator, and the at least one processor is further configured to:
retry the call attempt as the emergency call in the CS domain if the dialed number is available and is included in a local emergency number list received from the CS domain;
retry the call attempt as the emergency call in the CS domain if the dialed number is not available;
retry the call attempt as the emergency call in the CS domain if the dialed number is available and is not included in the local emergency number list received from the CS domain, and if the MCC or the MCC/MNC matches an MCC of a country or an MCC/MNC of an operator that requires a CS emergency call in response to the SIP message; and
retry the call attempt as the normal call in the CS domain if the dialed number is available and is not included in the local emergency number list received from the CS domain, and if the MCC or the MCC/MNC does not match the MCC of a country or the MCC/MNC of an operator that requires a CS emergency call in response to the SIP message.

18. The apparatus of claim 17, wherein the dialed number further includes prefix digits.

19. The apparatus of claim 17, wherein the SIP message is received when an IMS emergency service is unavailable.

20. The apparatus of claim 17, wherein the indication comprises exclusion of an element indicating an emergency associated with the dialed number, and the at least one processor is further configured to:
retry the call attempt as the normal call in the CS domain.

21. The apparatus of claim 17 wherein the indication comprises a first element indicating an emergency associated with the dialed number and a second element indicating that the call attempt is to be retried in the CS domain as the normal call, and the at least one processor is further configured to:
retry the call attempt as the normal call in the CS domain.

22. The apparatus of claim 21, wherein the indication further comprises a third element comprising digits to be included for the normal call in the CS domain.

23. The apparatus of claim 22, wherein the second element and third element are the same element.

24. An apparatus for wireless communication, comprising:
a memory; and
at least one processor coupled to the memory and configured to:
  initiate a call attempt in an internet protocol multimedia subsystem (IMS) based on a dialed number, the dialed number comprising an emergency number;
  receive a session initiation protocol (SIP) message in response to the call attempt and
  determine in response to the SIP message whether to retry the call attempt as a normal call in a circuit-switched (CS) domain for an operator or as an emergency call in the CS domain for the operator, wherein the determining is based at least in part on either an indication in the SIP message or on a characteristic of the operator,
wherein the characteristic comprises a Mobile Country Code (MCC) and a Mobile Network Code (MNC) for the operator, and the at least one processor is further configured to:
retry the call attempt as the emergency call in the CS domain if the dialed number is available and is included in a local emergency number list received from the CS domain;
retry the call attempt as the emergency call in the CS domain if the dialed number is not available;
retry the call attempt as the normal call in the CS domain if the dialed number is available and is not included in the local emergency number list received from the CS domain, and if the MCC or the MCC/MNC matches an MCC of a country or an MCC/MNC of an operator that requires a CS normal call in response to the SIP message; and
retry the call attempt as the emergency call in the CS domain if the dialed number is available and is not included in the local emergency number list received from the CS domain, and if the MCC or the MCC/MNC does not match the MCC of a country or the MCC/MNC of an operator that requires a CS normal call in response to the SIP message.

25. A non-transitory computer-readable medium storing computer executable code, comprising code to:
initiate a call attempt in an internet protocol multimedia subsystem (IMS) based on a dialed number, the dialed number comprising an emergency number;
receive a session initiation protocol (SIP) message in response to the call attempt; and determine in response to the SIP message whether to retry the call attempt as a normal call in a circuit-switched (CS) domain for an operator or as an emergency call in the CS domain for the operator, wherein the determining is based at least in part on either an indication in the SIP message or on a characteristic of the operator, wherein the characteristic comprises a Mobile Country Code (MCC) and a Mobile Network Code (MNC) for the operator, and the non-transitory computer-readable medium further comprises code to:

retry the call attempt as the emergency call in the CS domain if the dialed number is available and is included in a local emergency number list received from the CS domain;

retry the call attempt as the emergency call in the CS domain if the dialed number is not available;

retry the call attempt as the emergency call in the CS domain if the dialed number is available and is not included in the local emergency number list received from the CS domain, and if the MCC or the MCC/MNC matches an MCC of a country or an MCC/MNC of an operator that requires a CS emergency call in response to the SIP message; and retry the call attempt as the normal call in the CS domain if the dialed number is available and is not included in the local emergency number list received from the CS domain, and if the MCC or the MCC/MNC does not match the MCC of a country or the MCC/MNC of an operator that requires a CS emergency call in response to the SIP message.

26. The non-transitory computer-readable medium of claim 25, wherein the indication comprises exclusion of an element indicating an emergency associated with the dialed number, and the non-transitory computer-readable medium further comprises code to:

retry the call attempt as the normal call in the CS domain.

27. The non-transitory computer-readable medium of claim 25, wherein the indication comprises a first element indicating an emergency associated with the dialed number and a second element indicating that the call attempt is to be retried in the CS domain as the normal call, and the non-transitory computer-readable medium further comprises code to:

retry the call attempt as the normal call in the CS domain.

28. A non-transitory computer-readable medium storing computer executable code, comprising code to:

initiate a call attempt in an internet protocol multimedia subsystem (IMS) based on a dialed number, the dialed number comprising an emergency number;

receive a session initiation protocol (SIP) message in response to the call attempt; and determine in response to the SIP message whether to retry the call attempt as a normal call in a circuit-switched (CS) domain for an operator or as an emergency call in the CS domain for the operator, wherein the determining is based at least in part on either an indication in the SIP message or on a characteristic of the operator, wherein the characteristic comprises a Mobile Country Code (MCC) and a Mobile Network Code (MNC) for the operator, and the non-transitory computer-readable medium further comprises code to:

retry the call attempt as the emergency call in the CS domain if the dialed number is available and is included in a local emergency number list received from the CS domain;

retry the call attempt as the emergency call in the CS domain if the dialed number is not available;

retry the call attempt as the normal call in the CS domain if the dialed number is available and is not included in the local emergency number list received from the CS domain, and if the MCC or the MCC/MNC matches an MCC of a country or an MCC/MNC of an operator that requires a CS normal call in response to the SIP message; and retry the call attempt as the emergency call in the CS domain if the dialed number is available and is not included in the local emergency number list received from the CS domain, and if the MCC or the MCC/MNC does not match the MCC of a country or the MCC/MNC of an operator that requires a CS normal call in response to the SIP message.

* * * * *